US008752010B1

(12) United States Patent
Penner

(10) Patent No.: US 8,752,010 B1
(45) Date of Patent: Jun. 10, 2014

(54) DYNAMIC INTERFACE SYNTHESIZER

(75) Inventor: Robin R. Penner, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 1826 days.

(21) Appl. No.: 09/001,854

(22) Filed: Dec. 31, 1997

(51) Int. Cl.
G06F 9/44 (2006.01)

(52) U.S. Cl.
USPC ............................ 717/111; 717/109; 717/113

(58) Field of Classification Search
USPC .............................. 717/1, 100–110, 168–178; 345/762–764; 700/716; 709/203; 767/100–118
See application file for complete search history.

(56) References Cited

U.S. PATENT DOCUMENTS

| 5,119,479 | A |   | 6/1992  | Arai et al. |
| 5,335,320 | A | * | 8/1994  | Iwata et al. ................... 717/110 |
| 5,384,910 | A |   | 1/1995  | Torres |
| 5,404,441 | A |   | 4/1995  | Satoyama |
| 5,490,245 | A |   | 2/1996  | Wugofski |
| 5,491,784 | A |   | 2/1996  | Douglas et al. |
| 5,506,984 | A |   | 4/1996  | Miller |
| 5,509,116 | A |   | 4/1996  | Hiraga et al. |
| 5,519,866 | A |   | 5/1996  | Lawrence et al. |
| 5,522,024 | A |   | 5/1996  | Hiraga et al. |
| 5,524,238 | A |   | 6/1996  | Miller et al. |
| 5,533,184 | A |   | 7/1996  | Malcolm |
| 5,535,321 | A |   | 7/1996  | Massaro et al. |
| 5,550,965 | A |   | 8/1996  | Gabbe et al. |
| 5,555,346 | A |   | 9/1996  | Gross et al. |
| 5,581,755 | A |   | 12/1996 | Koerber et al. |
| 5,586,311 | A |   | 12/1996 | Davies et al. |
| 5,590,269 | A |   | 12/1996 | Kruse et al. |
| 5,600,778 | A |   | 2/1997  | Swanson et al. |
| 5,603,034 | A |   | 2/1997  | Swanson |
| 5,606,702 | A |   | 2/1997  | Diel et al. |
| 5,611,059 | A |   | 3/1997  | Benton et al. |
| 5,615,112 | A |   | 3/1997  | Liu Sheng et al. |
| 5,630,034 | A | * | 5/1997  | Oikawa et al. ................ 345/424 |
| 5,630,079 | A |   | 5/1997  | Mclaughlin |
| 5,630,117 | A |   | 5/1997  | Oren et al. |
| 5,634,053 | A |   | 5/1997  | Noble et al. |
| 5,642,511 | A | * | 6/1997  | Chow et al. ....................... 717/1 |
| 5,652,850 | A |   | 7/1997  | Hollander |
| 5,655,116 | A |   | 8/1997  | Kirk et al. |
| 5,774,119 | A | * | 6/1998  | Alimpich et al. ............. 345/340 |
| 5,844,554 | A | * | 12/1998 | Geller et al. .................. 345/762 |
| 5,920,725 | A | * | 7/1999  | Ma et al. ....................... 717/171 |
| 5,950,001 | A | * | 9/1999  | Hamilton et al. ............. 717/107 |
| 5,950,190 | A | * | 9/1999  | Yeager et al. ..................... 707/3 |
| 6,085,233 | A | * | 7/2000  | Jeffrey et al. ................. 709/216 |
| 6,098,094 | A | * | 8/2000  | Barnhouse et al. ........... 709/203 |
| 6,222,537 | B1 | * | 4/2001  | Smith et al. .................... 345/333 |

OTHER PUBLICATIONS

European Patent Application EP 0 798 634 A1.

\* cited by examiner

*Primary Examiner* — Chuck Kendall

(74) *Attorney, Agent, or Firm* — Schwegman, Lundberg & Woessner, P.A.

(57) ABSTRACT

A user interaction synthesizer is described in the context of an application program running on a computer system having diverse user interaction devices attached to it. The user interface for the application is dynamically designed and synthesized based on the states of individual application objects that are used by an interaction facilitator to traverse a framework of interaction elements and match situation variables to appropriate elements by a specialization process. Interaction elements are selected by the interaction facilitator to create an interaction space designed to satisfy the information needs of the current active objects in the application. Finally, a number of modules are used to convert the elements in the interaction space to generate a user interface as a function of the resources and devices available for the user.

16 Claims, 15 Drawing Sheets

210

```
┌─────────────────────────────────────────────┐
│ —              SARIR 0              ▽△      │
├─────────────────────────────────────────────┤
│ ACTIONS                                     │
├─────────────────────────────────────────────┤
│                                          ⇧  │
│   AIRCRAFT INCIDENT INFORMATION             │
│   ┌───────────────────────────────────┐     │
│   │ □─ AIRCRAFT TYPE              ⇧   │     │
│   │    □─ [AIRCRAFT]                  │     │
│   │       ├ 35XD DRAKEN [35XD]        │     │
│   │       ├ 200 SUPER KING AIR MOD 1900C │  │
│   │       ├ 200B SUPER KING AIR [200B]│     │
│   │       ├ 200C SUPER KING AIR [200C]│     │
│   │       ├ 200D SUPER KING AIR [200D]│     │
│   │       ├ 200E SUPER KING AIR [200E]│     │
│   │       ├ 200F SUPER KING AIR [200F]│     │
│   │       ├ 200H SUPER KING AIR [200H]⇩│    │
│   └───────────────────────────────────┘     │
│                                             │
│   ACTIVITY DAY-TIME:    [261352]            │
│   ACTIVITY LOCATION:    [3450N01230W]       │
│   ┌─ QUALIFIER ──────────────────────┐      │
│   │ ○ ACTUAL   ● ESTIMATED  ○ UNKNOWN│      │
│   └──────────────────────────────────┘      │
│              ALTITUDE:  [10]  ▲▼            │
│   (FEET 100s ABOVE MSL)                     │
│   COLOR:  [ORANGE ⇩]                        │
│   ┌─ CAMOUFLAGE ─────────────────────┐      │
│   │ ○ WOODLAND  ○ DESERT RED  ○ DESERT GRAY│
│   │ ● WINTER    ○ UNKNOWN            │      │
│   └──────────────────────────────────┘      │
│   AIRCRAFT TAIL LETTERS AND SIDE NUMBER: [UNKNOWN]│
│   CAUSE OF LOSS OF AIRCRAFT:                │
│                          ┌─────────────┐    │
│                          │SMALL ARMS ⇧ │    │
│                          │STRAFING AERI│    │
│                          │UNKNOWN WEA  │    │
│                          │WEATHER      │    │
│                          │UNKNOWN    ⇩ │    │
│                          └─────────────┘    │
│   PERSONNEL ON BOARD:  [0] ▲▼               │
└─────────────────────────────────────────────┘
```

FIG. 2

DYNAMIC INTERFACE SYNTHESIZER

FIELD OF THE INVENTION

The present invention relates to computer interfaces, and in particular to the dynamic generation of interfaces matching the capabilities of the computer to the information to be communicated.

BACKGROUND OF THE INVENTION

Interactions between humans and computer systems began with very primitive interfaces, such as a light emitting diodes and switches. The interfaces have quickly evolved to the use of keyboards, touchpads and joysticks for the user to communicate with the computer to multimedia presentations by the computer to communicate to the user. User interfaces also refer to the manner in which programs communicate with each other. Most of these interfaces are static in nature, and are supported by programming in applications and other programs that are running on the computer. When the computer is being used to control real time processes, such as building automation or industrial process control, it is difficult to anticipate all of the potential user interactions with a computer, and to provide a static interface for each such interaction. The process being controlled can do things that are not anticipated, and also, further equipment, such as sensors and motors can be added to the process. There is a need for a flexible interface that can provide for user friendly interactions with the computer, even when the computer is being used to control changing processes.

Static design of user interfaces requires the application of specialized, ever-changing knowledge possessed by talented, trained individuals, responding to evolutionary and revolutionary changes in technological capabilities in an environment where it is difficult to quantify procedures or results. It is difficult for a programmer to keep up with such individuals. Once a static interface for a system is designed, using well known design rules, it is difficult to change, and unless there is a great need, the design usually remains unchanged. This can result with a system having a less than optimal user interface for extended periods of time, while the underlying capabilities of the system may have dramatically changed.

Further, even when performed optimally, static interaction design is no longer sufficient to meet the task and information needs of current systems. Current systems are getting more complex, with multiple collaborating computational and human agents. Areas of maximum unpredictability include which interactions will be required, what information will be available, what hardware and software capabilities will exist in local and distributed forms, what experience and capabilities will be contributed by humans, and what different devices will be used by the same human at different times. This unpredictability will also vary extensively over time and location.

While automatic design critiquing systems exist, there are as yet no systems which perform even the automatic design of static interactions. Earlier efforts abandoned design altogether, given that it was difficult to automate a design process that is difficult even for humans to perform. Instead, researchers concentrated on computer-aided design, which helps designers create static designs. Further, in U.S. Pat. No. 5,550,971 to Brunner et al., a knowledge base was constructed for automatic generation of query templates based on well understood and unchanging stereotyped interactions, such as query of a database.

SUMMARY OF THE INVENTION

A user interface is dynamically synthesized for an application running on a computer system. Objects in the application both serve and create user interaction needs that are used by an interaction facilitator to traverse a framework of interaction elements and match the needs to appropriate elements by a specialization process. Abstract interaction elements have multiple concretizable elements that are selected by the interaction facilitator for use in generating an interaction space which contains elements representative of the information needs of the current users and instantiated objects in the application. Finally, a number of software modules are used to convert the elements in the interaction space to generate a user interface as a function of the resources and devices available for the user.

In one embodiment, multiple generic design elements are selected as a function of selected properties of an object in the application. First, a general model of interaction requirements is generated for general situational components of the application program. This model is maintained in the interaction space. Then a representation of current interaction requirements is constructed using the model. Interaction artifacts are then created from the representation based on abstract compositional constraints. Finally, the user interface of the application program is dynamically created based on the interaction artifacts and available devices by the use of software modules referred to as technicians. A JavaTech module is used to create graphical user interfaces, and a SpeechTech module is used to create audio interfaces for devices such as telephones from the same interaction space.

In one embodiment, the dynamic interface generator is applied to a search and rescue application. Dynamically changing task and display requirement are used to compose on-line designs of user interfaces. The interfaces are generated in direct response to the properties of the data and the user. The interaction space is inherently dependent on the situation The user interface is therefore, centered on the user and the task, and firmly rooted in the principles of good user interface design as they are represented in the general model.

The dynamic interface generator benefits both developers and user of mixed initiative assistive systems. Developers are assured good design and a consistent look and feel to applications, and a large measure of platform independence. Product developers can rapidly and easily modify and create user interfaces to their system through modification of the dynamic interface generator. This helps reduce development costs and effort. Because of the ease of modification, incremental advances in computing capabilities, languages and infrastructures can quickly be used to enhance products. User interface designers also benefit, since incremental advances in the state of the art can easily be added to existing general models or technician procedures.

A further advantage of the invention is that users are not required to perform laborious interface definition and configuration to specialize an application to their requirements. The interface definition and configuration is automatically provided along with well designed state of the art user interfaces. Users also feel more in control and connected to their tasks with a consistent interface over varying situations. Upgrades and model evolution are provided with dynamic responsiveness to context, task, situation and user intentions without the need for retraining and support.

BRIEF DESCRIPTION OF THE DRAWINGS

FIG. 2 is a block representation of a user interaction space generated by the user interaction generator of FIG. 1.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense, and the scope of the present invention is defined by the appended claims.

Numbering in the Figures is usually done with the hundreds and thousands digits corresponding to the figure number, with the exception that the same components may appear in multiple figures.

The invention will be described with reference to a bock diagram of a computer system in FIG. 1, followed by an example of a dynamically generated user interaction representation in FIG. 2. The remaining description will describe logical representations of applications, and the frameworks used to generate user interaction spaces or interfaces on a real time dynamic basis.

The present invention is described with respect to an embodiment using an object oriented architecture. Every object (an encapsulated collection of data and/or programming) has an interface that defines the operations that may be performed on the object. Some examples of object oriented languages include C++, Smalltalk and Java, as well known to those skilled in the art. Objects are arranged in classes. Where an object fits into the classes defines some of the things it can do, and things that can be done to it. By using the class relationships and a hierarchy of user interaction elements the present invention provides a dynamically generated user interface.

Figure 1:
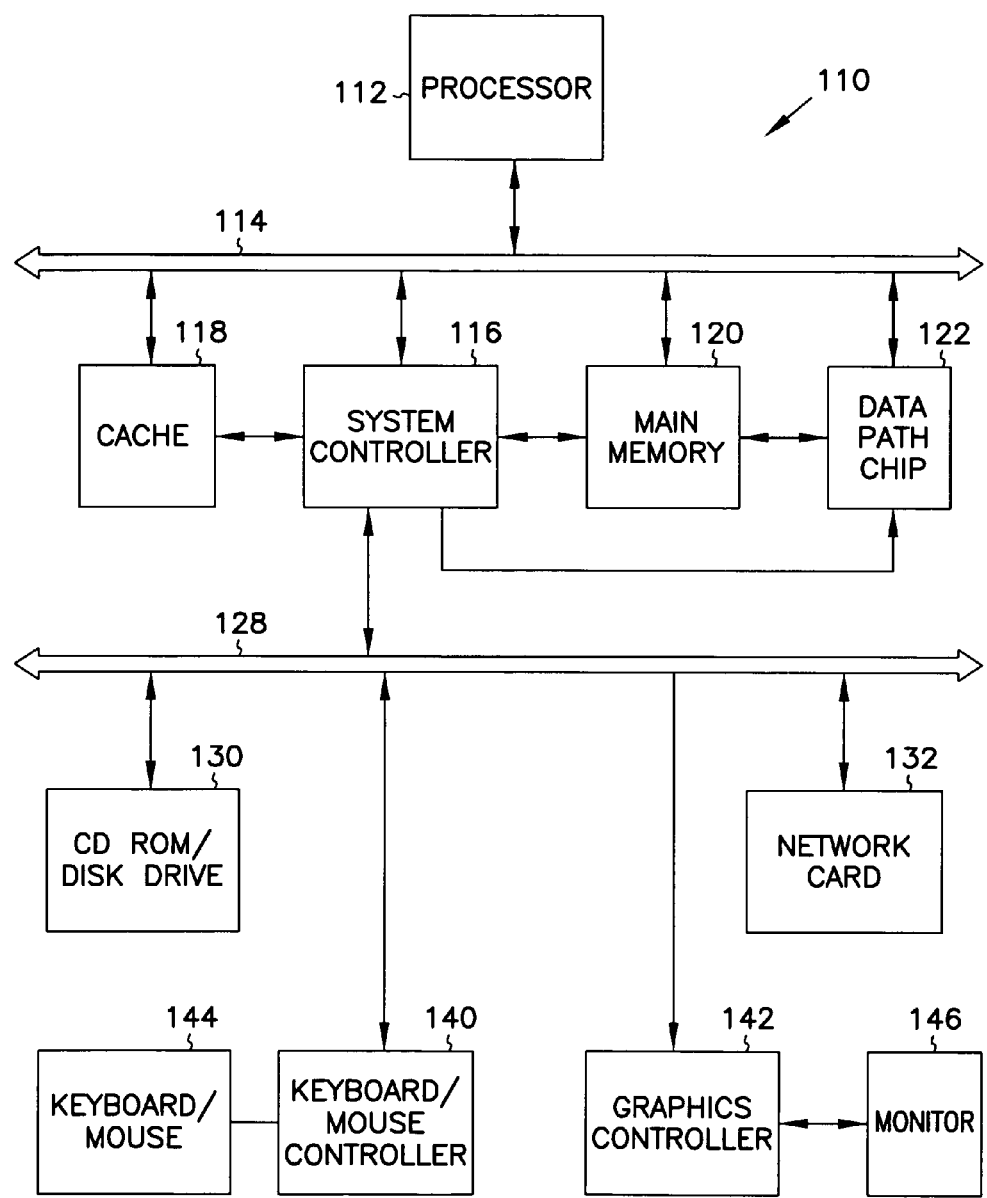
FIG. 1 is a block diagram of a computer system having a user interaction generator constructed in accordance with the present invention.

In FIG. 1, a typical personal computer is shown generally at 110. A processor 112 is coupled to a host bus 114. Also coupled to the host bus is a system controller 116, a cache 118, a main memory 120 and a data path chip 122. Processor 112 is typically a microprocessor. Cache 118 provides high-speed local-memory data for processor 112 and is controlled by system controller 116 in a well known manner. Main memory 120 is coupled between system controller 116 and data-path chip 122, and in one embodiment provides random access memory of between 16 MB and 128 MB of data. In one embodiment, main memory 120 is provided on SIMMS (single in-line memory modules), which plug into suitable sockets provided on a motherboard holding many of the components shown in FIG. 1.

The system controller 116 is also coupled to a bus 128, which represents multiple buses, including a PCI (Peripheral Component Interconnect) bus and an ISA bus, which couple multiple other devices, including secondary storage devices indicated at 130, network adapters indicated at 132 a keyboard/mouse controller 140 and a graphics controller indicated at 142. The keyboard controller 140 is provides a port for coupling to a keyboard 144, which the graphics controller 142 provides a port for coupling to a display device or monitor 146. The keyboard controller 140 and graphics controller 142 thus provide at least some of the user interaction capabilities that are dynamically utilized to allow the user to interact with and control the computer, which in turn is running the application. The application may comprise a society of objects whose capabilities and needs are tracked by a dispatcher, and may make use of multiple computers which are coupled via the network card 132 to exchange information via an ethernet or other type of protocol.

FIG. 2 shows one interface or interaction space generated for a search and rescue situation (SARSIT) application which keeps track of and coordinates massive search operations for a downed pilot during wartime or other situations. The interface is used to collect and display data on downed aircraft, and comprises a window indicated generally at 210 for display on monitor 146. It should be noted that the present invention would dynamically create different displays on monitors having different capabilities, such as a monitor having touch screen ability. Further, other devices could be used, such as a telephone. The "display" elements would then perhaps take the form of speech synthesis, with data entry either being by voice or telephone keypad.

The application is composed of objects related to each other in a framework or class hierarchy. Many of the objects provide information related to the search operation, such as real time sensing of weather and tracking information derived from multiple automated and manual sources. In such an object oriented program environment, each object contains information about the types of data it provides and receives. For example, an application object representing a particular lost airplane contains information about its properties and subparts; the application object representing this plane's color contains information about the current color and allowable colors.

It is this information and placement in the framework for each object requiring a human interface, along with a related framework of interaction elements that allows the dynamic generation of an internal user interface, which is further used to generate an actual interface dependent on interface device characteristics.

A typical search and rescue operation application provides and processes information that is extremely situation specific. For example, if a pilot ejects over water, ocean current information is crucial, but if the pilot ejects over land, the ocean currents become irrelevant. Given the non deterministic nature of airplanes going down, or ships being sunk, all of the useful information sources cannot be known a priori. For example, witnesses cannot be known before an incident occurs. The tactics used to accomplish the tasks are also situation dependent. For example, in a combat situation, searching must be accomplished by means other than flying search patterns because the searcher's predictability makes the search craft vulnerable to enemy fire. Crucial information is often not on line, making off line portions of tasks very important. For instance, personal pilot information and photographs might only be in hard copy format. Given the variability and evolution of the situation dependent tasks, the user may not be aware of many on line information sources. Finally, and most importantly, time is of the essence. The chances of recovering a survivor are inversely proportional to the time it takes to find them. Interfaces must be quickly adapted to each situation to provide for optimal interaction between the user and the system.

Some of the elements of the display of FIG. 2 comprise a list of aircraft involved in the search at 212 which are arranged in a hierarchical format, much like a folder and subfolder type of arrangement. Two edit blocks indicated at 214 and 216 provide space for entering time of day and activity location information. An indicator button arrangement at 218 provide push buttons for user selection indicating the type of event being displayed or information being entered. The altitude of the aircraft is indicated at 220 in an edit box, with a pair of push buttons for changing the value either up or down. A color selection button is provided at 222, and camouflage selection options are provided at 224 in the form of buttons. An edit box is provided at 226 for entering the tail letters and side number of the aircraft. A cause of loss information box is provided at 230 along with more selection buttons for scrolling between possible listed causes. Finally, at 232, an edit box with more value changing pushbuttons is provided.

As can be seen, there are many different types of elements that can be arranged on a display. In prior devices, user interface designers would provide an arrangement of elements for each particular desired view of information and information input requirements. There are many design rules and guidelines for providing the elements in a clean and orderly manner. However, as previously indicated, the application and the information processed by the application may rapidly change. There is little time left to provide an optimal design in accordance with the rules and guidelines. The present invention solves this problem by matching a hierarchy of design elements with the application and dynamically creating the user interface.

Figure 3:
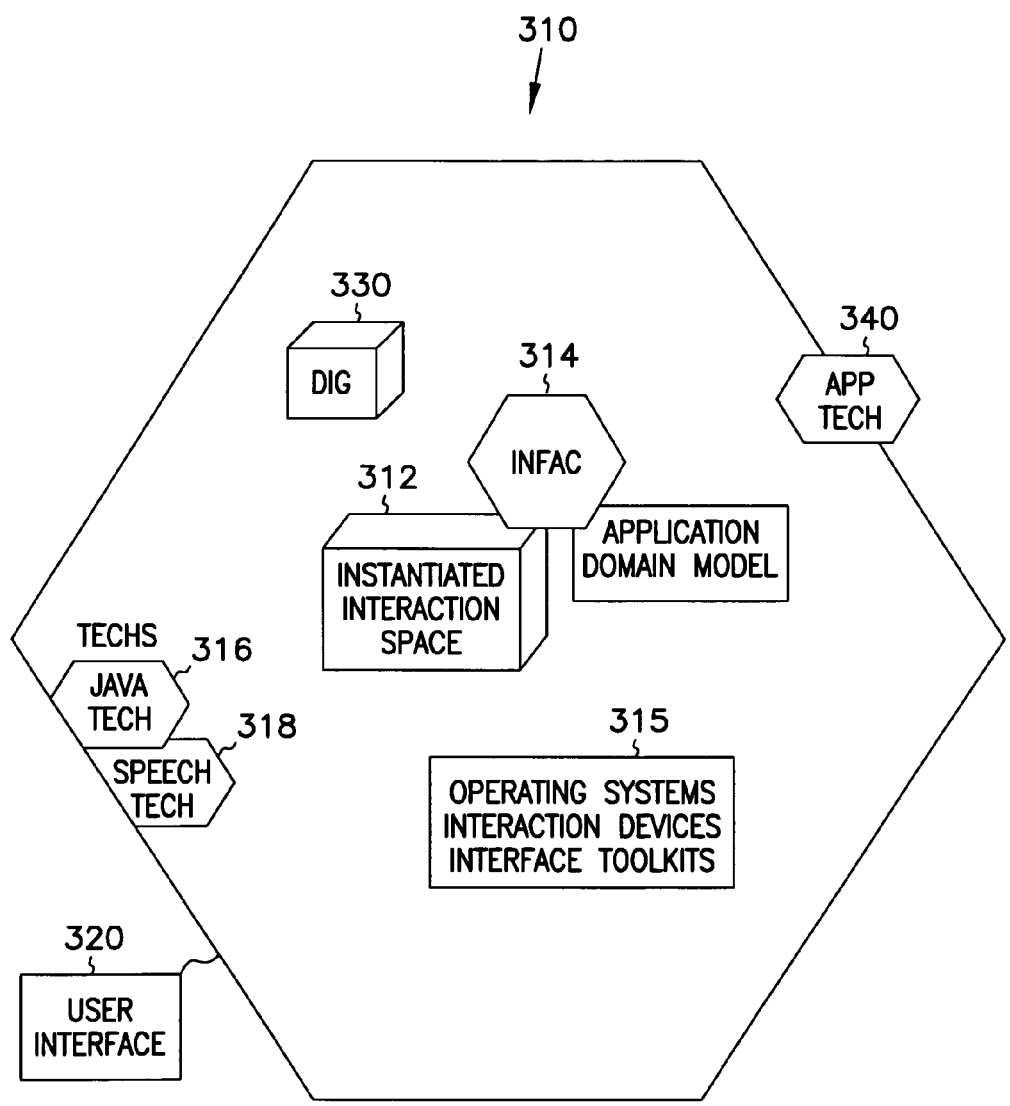
FIG. 3 is a block diagram representation of functional components of the user interaction generator of FIG. 1.

Programming code to accomplish dynamic interface generation (DIG) is shown in a functional block diagram in FIG. 3 indicated generally at 310. A specialized group of software agents or modules is represented and referred to as an interaction management team. The interaction management team 310 has the ability to dynamically generate concise, context-sensitive, well-designed user interfaces (UIs) between a user and a computer to provide not only ongoing task support, but also collaborative dynamic dialogs between a human and software agents. The team provides two basic processes comprising the generation and maintenance of an on-going interaction space 312, representing the interaction from the human user's perspective. An interaction facilitator agent (InFac) shown at 314 performs this function. The second basic process comprises the generation and maintenance of a required appropriate realization of the interaction space on the available hardware, using the available operating system and an interaction toolkit such as Java, HTML, Motif, etc as indicated at 315. This is also performed by interaction techs, which include many modules for converting the interaction space into constructs perceivable by the user. Two such techs are indicated at 316 and 318 as the Java Tech and the Speech Tech. These functions allow the interaction management team to dynamically generate the necessary user interface 320 dictated by the current situation, the user's goal and capabilities, and the available hardware and software.

The interaction management team uses a process called dynamic interaction generation (DIG) 330 to translate the actions and knowledge of the software agents into easily understandable representations for the human, and vice versa. DIG incorporates the current state of the art in user interface and software design methodologies and processes to generate user interfaces at run-time. Additionally, DIG facilitates incorporation of advances in the state of the art or improvement to usability without requiring laborious modifications.

At the heart of the DIG process is an interaction class model which contains a detailed model of user interaction components and their mutual compositional constraints. This model is based on abstracted principles of best practices user interface design (Galitz, Wilbert O. *The Essential Guide to User Interface Design*. New York: Wiley, 1997, and Mandel, Theo. *The Elements of User Interface Design*. New York: Wiley, 1997, both of which are hereby incorporated by reference for the rule based knowledge that they provide in terms of interface design). The model is also based on a consistent approach for interaction with building management and process control applications such that they are intuitively operated by users, contain a consistent physical layout metaphor and use consistent object grouping metaphors which make sense given the processes being controlled. It also incorporates multiple views of information and gives users the ability to control the amount and type of information available through direct manipulation interaction such as by use of a mouse.

The interaction class model has concrete classes that are instantiated, modified and destroyed dynamically as interaction needs change to create the interaction space 312, which represents the on-going state of the human interaction with the computer. The model is essentially a description of the composition of various interaction levels that can be described for any user interface to a complex process.

Also shown in FIG. 3, is an application technician 340 which is software which facilitates the transfer of data between the application in the interface facilitator 314. Further, an application domain model 342 is representative of InFac 314 knowledge of the structure of the domain model of the application.

Figure 4:
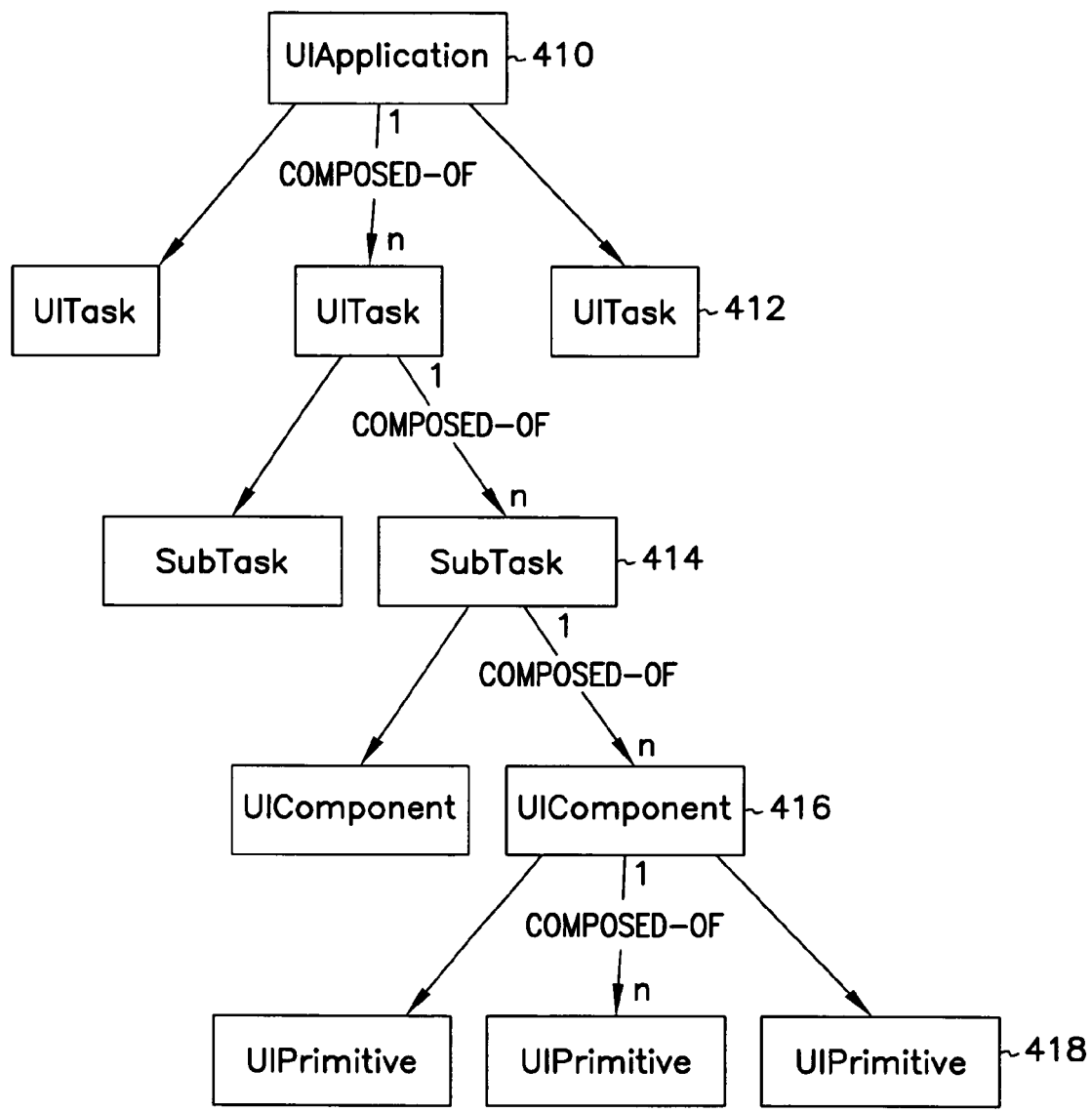
FIG. 4 is a block diagram representation of compositional levels in an interaction space of the user interface generator of FIG. 1.

Compositional levels of the multi level interaction class model are shown block form in FIG. 4. A top level 410 comprises the user interface application (UIApplication), which represents a collection of tasks that are required by a human participating in a semi-automated mixed initiative collaboration, e.g., managing the environment, security, and mechanical resources of a building, or conducting a combat search and rescue operation.

An application is composed of various user interface tasks (UITask) 412. There are three basic types:
1. global tasks, which involve meta-interactions such as choosing the task to perform, choosing the object to investigate, alerting the user to the need for a system initiated interaction,
2. object specific tasks, which are interactions with a specific object in the application domain such as a schedule for a particular object, the trend of a sensed value, or the layout of a physical space, and 3. transient tasks, which are user- or system-initiated discourse acts such as the system asks the user to authorize an action or the user asks the system to overlay town names on the map.

User interface tasks are themselves composed of the third level of organization in the model: User Sub Task (UISubTask) at 414. For example, there are two interactions required to choose an object in the application domain: 1) Choose the information organization such as a process vs. function) and 2) Choose the object within the organization such as a specific report, a piece of equipment, or a plan.

Subtasks are in turn composed of user interface components (UIComponent) 416, which are roughly analogous in function and complexity to common user interface widgets such as value slider, trend graphs, entry boxes, and menu lists. UIComponents are not, however, directly tied to widgets; rather they are an abstract representation of the interactions and information rendered by those widgets. For example, a bus schedule is represented in the interaction space as an element from an itemovertime (see 820) class. If it is eventually presented on a display screen at a kiosk at the bus station, it would be represented by a different widget such as a trend plot than it would be if it is delivered over a telephone—a series of times and stops, presented sequentially in spoken English. Despite their eventual mapping to very different user interface widgets, the elements required to convey the time-event pairs that make of the bus schedule in the interaction space is the same.

The interaction space representation allows the interaction team to generate fully specified descriptions of the interaction with the human, without reference to any specific hardware. This type of adaptability to a current situation allows InFac 314 to make use of whatever resources are currently available, most appropriate, or preferred by the user. The final level of interaction space provides additional hardware independence. Components are broken down into user interface primitives (UIPrimitive) 418, such as identifiers and selectable spaces to allow the interaction team to individually handle information and interactors. This separates, for example, the name of a choice from the actual choice, allowing the team to compose both labeled buttons ("Print"), where the information appears on the interactor, and telephone interactions ("To Print press 1"), where the information about the action must come before the name of the interactor.

The various levels of the interaction class model are compositional. At each level, the classes are composed of objects from classes at the next lower level. A user interface application is composed of user interface tasks, which are composed of user sub tasks, and so on. This compositional pattern provides control over the resolution of high level objects such as windows, graphs, diagrams and datasets into lower level objects such as scrollbars, timelines, pushbuttons and edit boxes.

Figure 5:
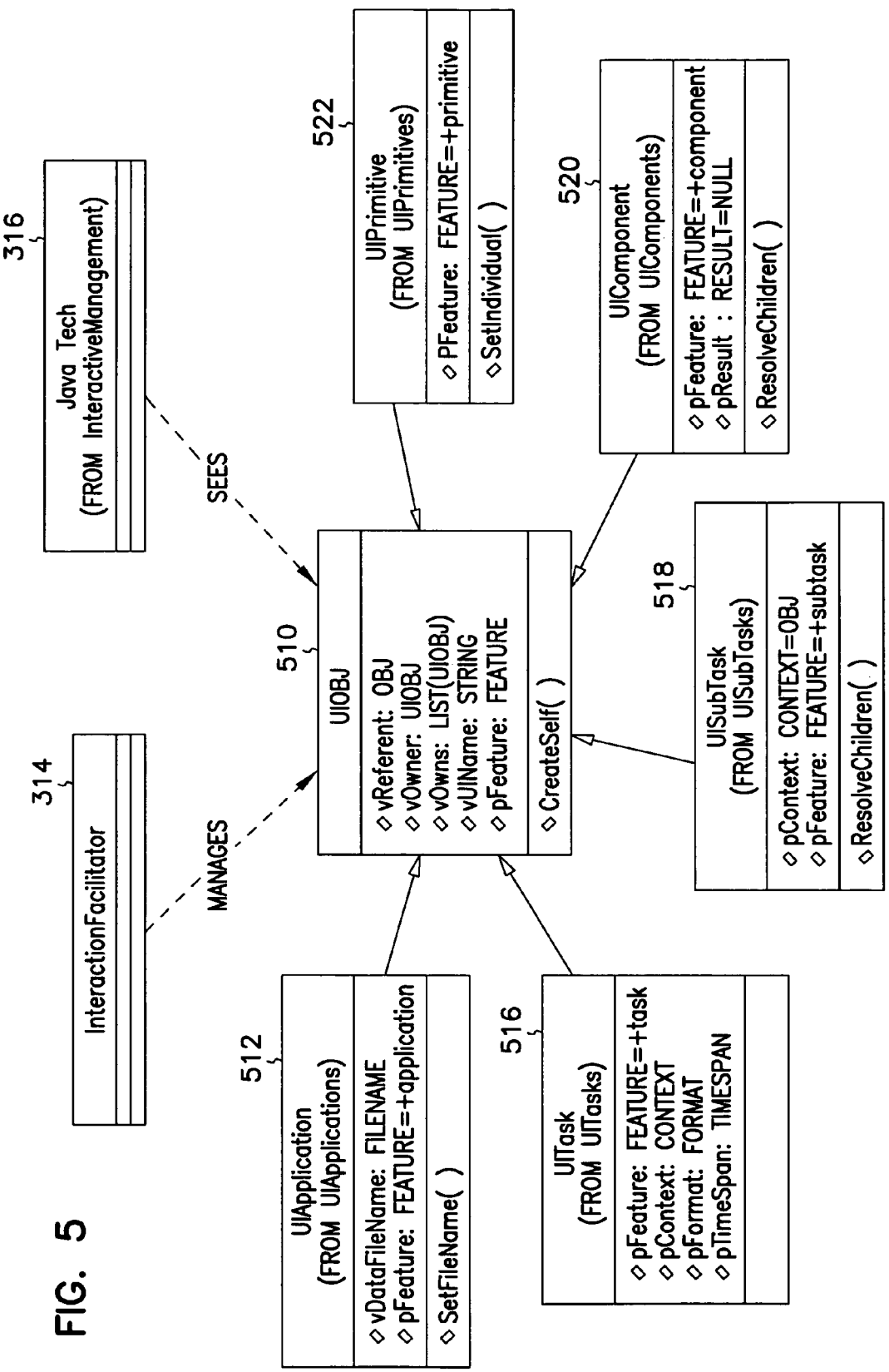
FIG. 5 is a block diagram representation of the compositional levels of a multi level interaction class model.

The interaction class model levels are shown with further detail in FIG. 5, and correspond to the application compositions/windows in the user interaction, the interactions contained within each composition, the components used for each interaction, the interactors that make up individual components, and the interaction primitives that are used by the interactors to realize themselves. All of these classes are specializations of an abstract user interface object 510, and thus inherit from the parent class the knowledge of how to create, modify and kill themselves as well as several variables and a property as shown. The user interface object 510 is the root node for the DIG class model. All interaction classes know how to create themselves. If they are abstract classes and can't be instantiated until they are concretized, they trap the createself operation and send it on to their most appropriate specialization. Concrete classes pass the CreateSelf operation through their parent and on to a root node, which executes the instantiate of the concrete class by setting its variables comprising Referent, Owner, Owns, and UIName, executing any category-specific operations, determining the number of sub-components the object has, and sending CreateSelf operations down to each of the sub-component classes. Terminal category classes such as UIPrimitives 522 execute their own internal operations instead of instantiating sub-components.

Every object in the interaction space has a variable Referent which is used to identify an object referred to. Usually it is an object in the domain model. Every object in the interaction space also has variables comprising Owner and Owns, which simply refer to which objects it is contained in or contains. Variable UIName is simply a name given the object when it is instantiated. A pseudo code representation of the interaction class model is provided in Appendix A.

Each of the interaction levels shown are themselves representative of full specialization hierarchies whose leaf nodes are concrete classes that are instantiated into user interface objects during the process of user interface generation or modification. The levels have the capability to modify parameters, such as the Feature parameter, and also may specify further operations, such as SetFileName, ResolveChildren and SetIndividual, including the operations inherited from UI Object 510. The levels comprise a UIApplication level 512, UITask level 516, UISubtask level 518, UIComponent level 520, and a UIPrimitive level 522. Also shown are InFac 314 which manages the user interface objects 510 and the JavaTech 316 which can only see the interaction space to synthesize the actual interaction with the user.

Figure 6:
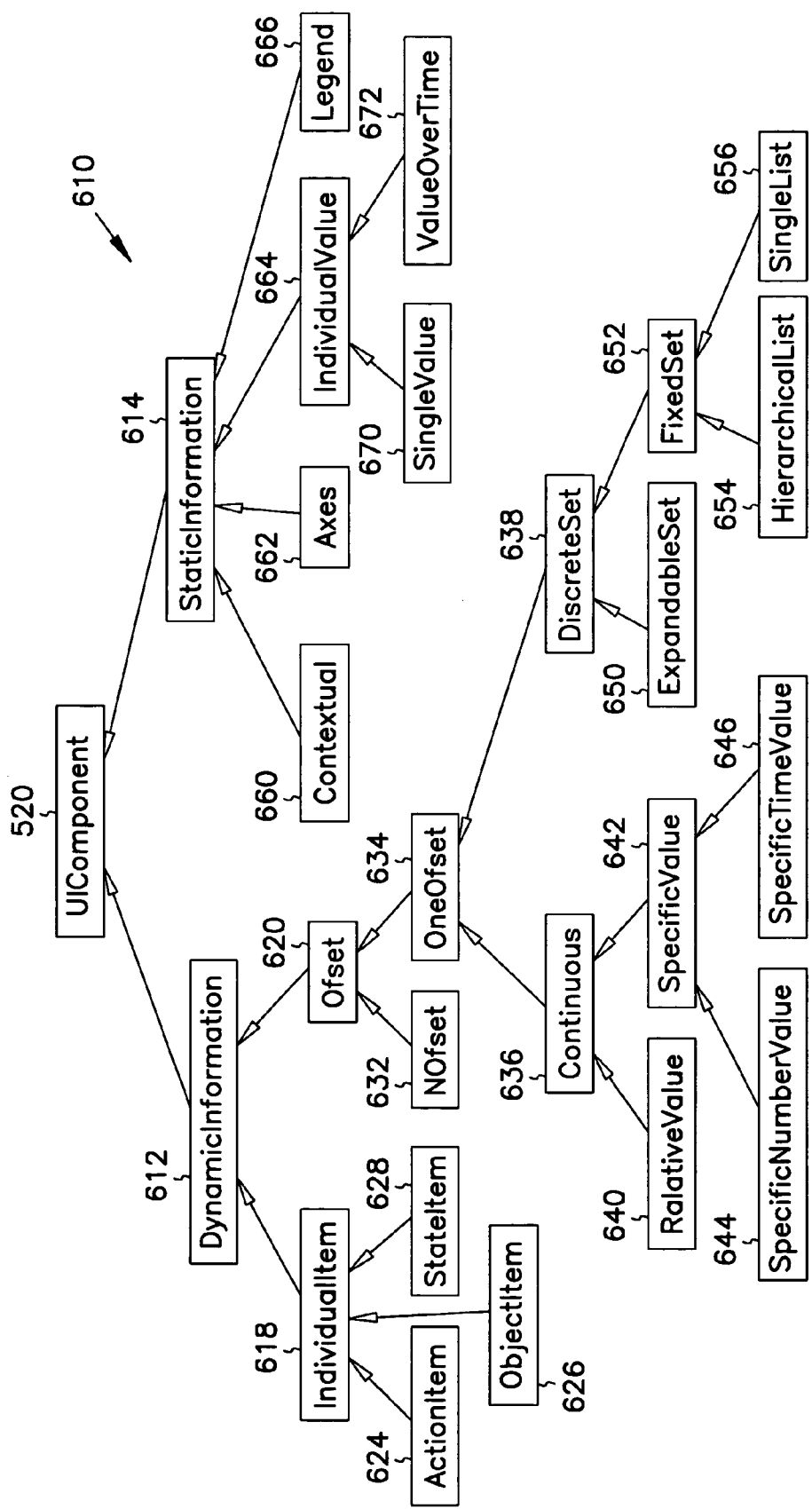
FIG. 6 is a block diagram representation of a component compositional level of specialization in the class model of FIG. 5.

As an example, the composition of the UIComponent level 520 is shown in simplified block form in FIG. 6 generally at 610. The instantiable classes are the leaf nodes at the bottom of the hierarchy. One of the benefits of representing the classes at each level as a specialization hierarchy is the ability to specify abstract classes, which can be resolved at run time based on dynamic situation attributes. Some of the abstract classes in this representation include DynamicInformation 612 and StaticInformation 614. The DynamicInformation class 612 has subclasses comprising IndividualItem 618 and OfSet 620. IndividualItem class 618 has further subclasses ActionItem 624, ObjectItem 626 and StateItem 628 which are leaf nodes. OfSet 620 has further subclasses comprising leaf node NOfSet 632 and OneOfSet 634 which represent the cases where the interface is not of a set or is one of a set respectively.

OneOfSet class 634 is comprised of a Continuous class 636 and a DiscreteSet class 638. Continuous class 636 further comprises leaf node RelativeValue 640 and SpecificValue 642, which comprises leaf nodes SpecificNumberValue 644 and SpecificTimeValue 646. DiscreteSet 638 further comprises leaf node ExpandableSet 650 and FixedSet class 652. FixedSet class 652 comprises leaf nodes HierarchicalList 654 and SingleList 656.

StaticInformation class 614 comprises leaf nodes Contextual 660, Axis 662 and Legend 666. It also comprises an Individual Value class 664. This class is further comprised of leaf nodes SingleValue 670 and ValueOverTime 672.

In addition to the hierarchical specialization levels, the classes at the UIComponent level are composed of objects from classes at the next lower level and also make up object of the next higher level. An application user interaction is composed of compositions, which are composed of interactions, and so on. This is the compositional pattern, which provides more control over the resolution of high level objects such as windows, graphs, diagrams and datasets into lower level objects such as scrollbars, timelines, pushbuttons and edit boxes.

Figure 7A:
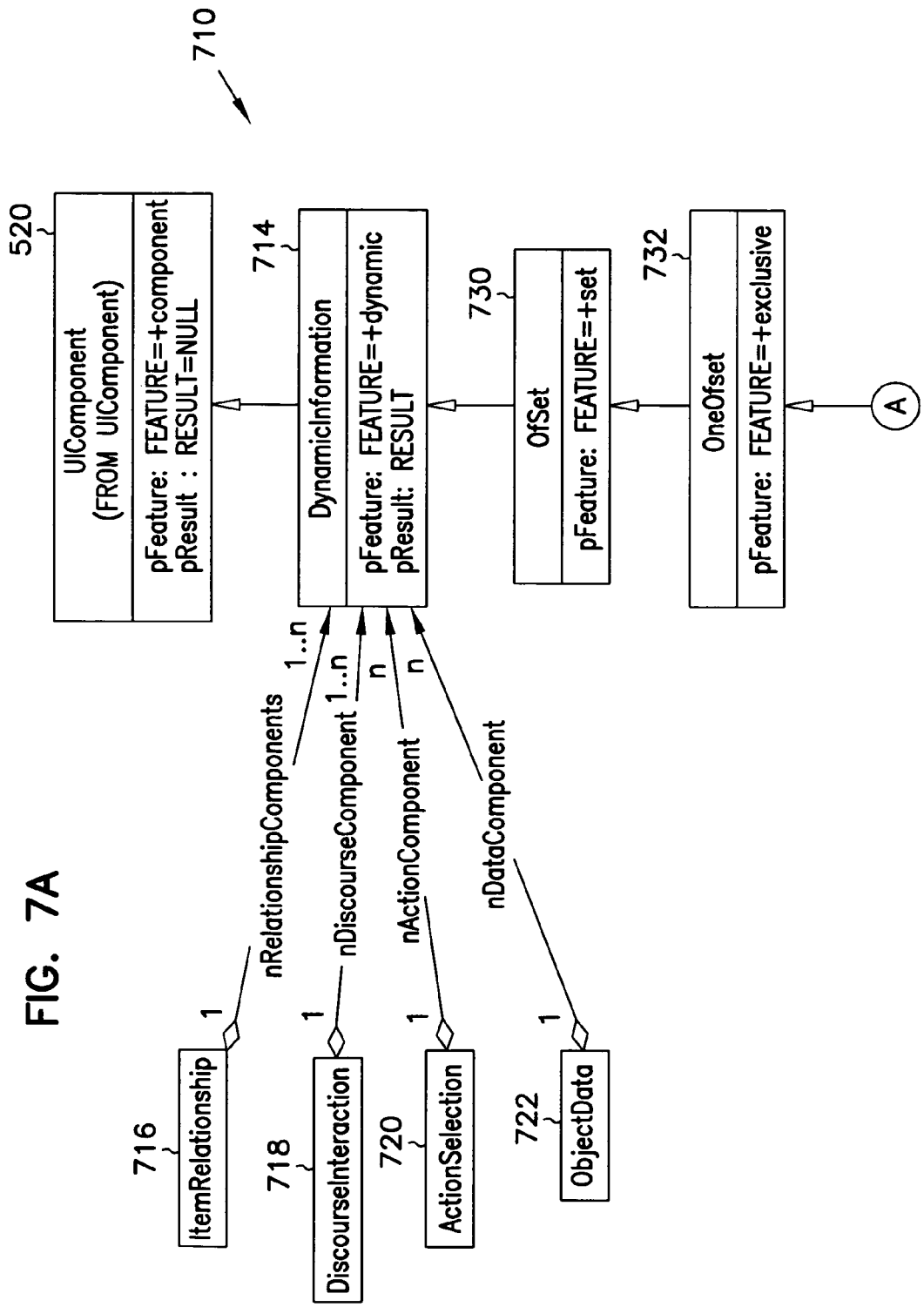
FIGS. 7A and 7B are a block diagram representation of one segment of the component hierarchy showing "composed-of" relationships.
Figure 7B:
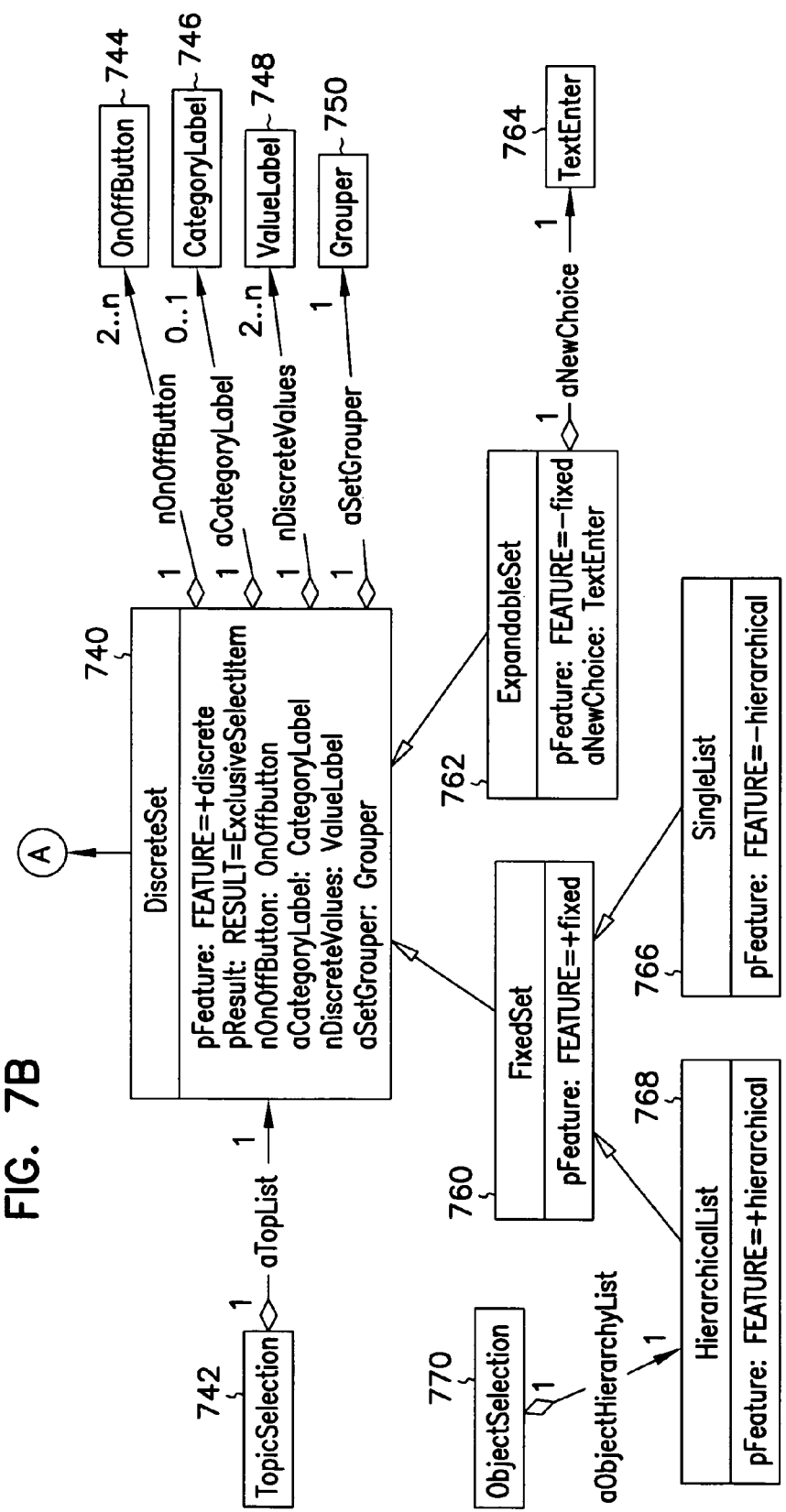

An example of one segment of the component hierarchy is shown in FIGS. 7A and 7B generally at 710, which shows a small portion of the UIComponent 520 hierarchy. A first abstract component of UIComponent 520 is a DynamicInformation component 714. One or more of the DynamicInformation components are used to form subtasks such as ItemRelationship 716, DiscourseInteraction 718, ActionSelection 720 and ObjectData 722. The DynamicInformation component is specialized into an OfSet abstract component 730, which is further specialized into a OneOfSet abstract component 732. The OneOfSet abstract component 732 is specialized into a DiscreteSet component 740 which is used to form a TopicSelection subtask 742, and is composed of low level primitives comprising OnOffButton 744, CategoryLabel 746, ValueLabel 748 and Grouper 750. Grouper 750 functions to cause a line being shown around related primitives, such as a group o OnOffButtons representing multiple different color selections.

DiscreteSet 740 is further specialized into either a FixedSet component 760 or an ExpandableSet component 762. ExpandableSet component 762 is a leaf node composed of a TextEnter primitive 764 which facilitates the entering of a new text value such as a new color which is not one of the fixed set of colors. FixedSet component 760 is composed of leaf nodes SingleList 766 and HierarchicalList 768. Finally, an ObjectSelection subtask 770 is made up of 1 HierarchicalList 768.

As in previous figures, parameters shown in the components are identified with a "p" prefix, while the number of primitives are identified by a prefix "a" corresponding to one primitive, or "n" for more than one. Each specialization of components can modify the parameters to be representative of the path of specialization.

Two important interaction generation abilities are made possible by the organization and contents of this model:
  The ability to retrieve and enter the model at any node, based on an interaction need perceived when there is a change in an application object, and create an interface specification down through the compositional hierarchy starting at that node. Given the need for a particular interaction, such as a trend display, the constituent components, their interactors, and the individual interaction primitives are automatically generated and assigned the proper values, labels, and relationships.
  The ability to specify abstract components, and have them resolved based on the interface context and the state of application objects, such as the type of information to be represented and the type of information to be obtained from a user. For example, a process object may use different controls (sliders, gauges, or pushbuttons) depending on its state and the type of display on which it appears. Because of this, the controls associated with a displayed process object are represented in the compositional model as abstract classes. In the interactor model, a component may be defined as composed of a statebutton, which is abstract and cannot be instantiated. The statebutton contains information about how to resolve itself based on the data requirements of the higher level component of which it is part. If the information to be represented is exclusive, it is resolved as a radiobutton, which must be further resolved based on the type of information represented.

The current interaction model is easily modified as iterative development of the interaction generation system continues. However, in its current state as described, the organization, compositional outline and the individual properties, parameters, and methods of the individual classes are sufficient for the dynamic generation of process interactions.

Figure 8:
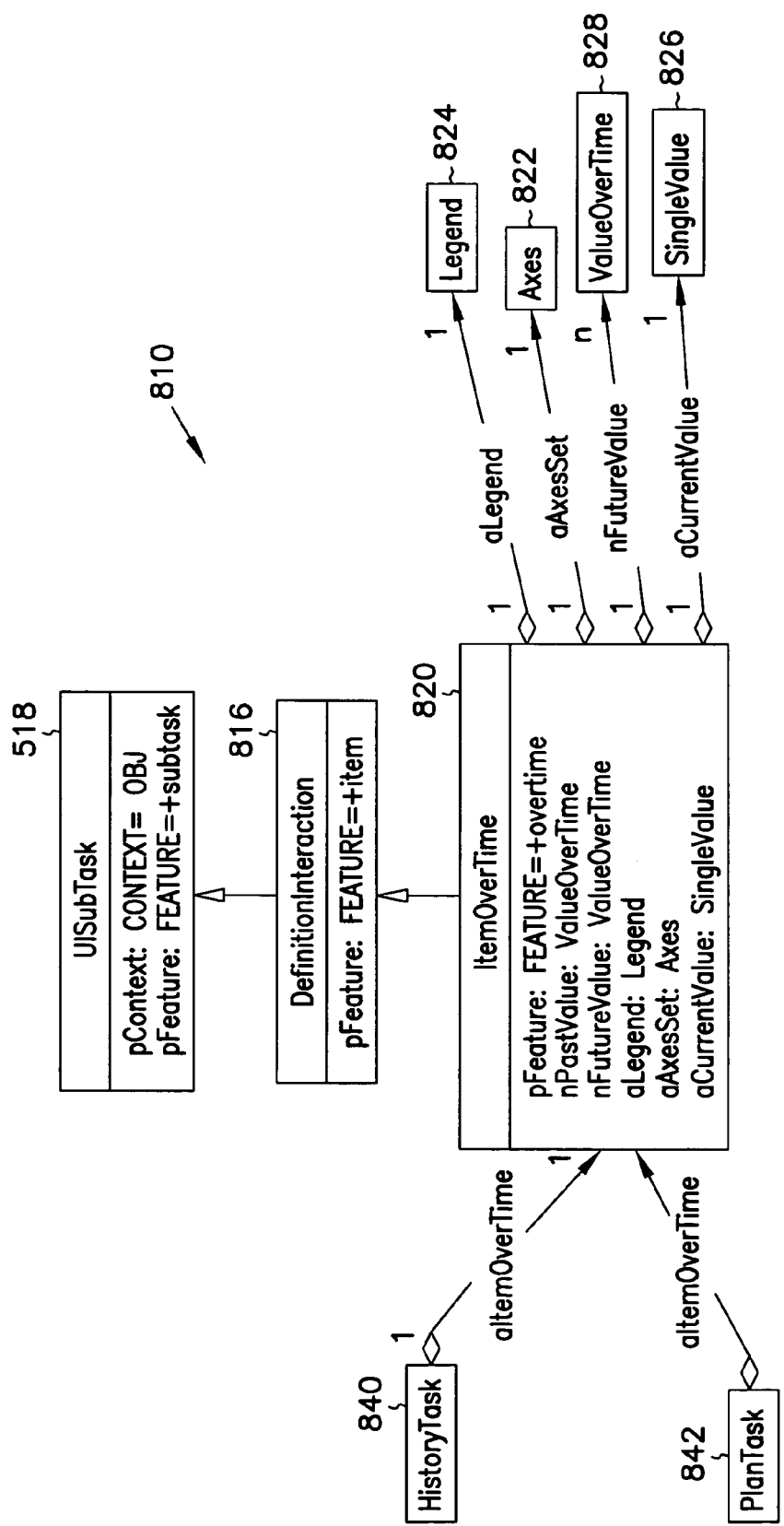
FIG. 8 is a block diagram representation of one segment of the subtask compositional level of specialization.

An example of one segment of the UISubTask component hierarchy is shown in FIG. 8 generally at 810, which shows a small portion of the UISubTask 518 hierarchy. A first abstract component of UISubTask 518 is a DefinitionInteraction 816, which is further specialized into an ItemOverTime subtask. A HistoryTask 840 and PlanTask 842 are both comprised of ItemOverTime subtasks. The ItemOverTime subtask 820 is made up of subparts Legend 824, Axes 822 ValueOverTime 828 and SingleValue 826.

Figure 9A:
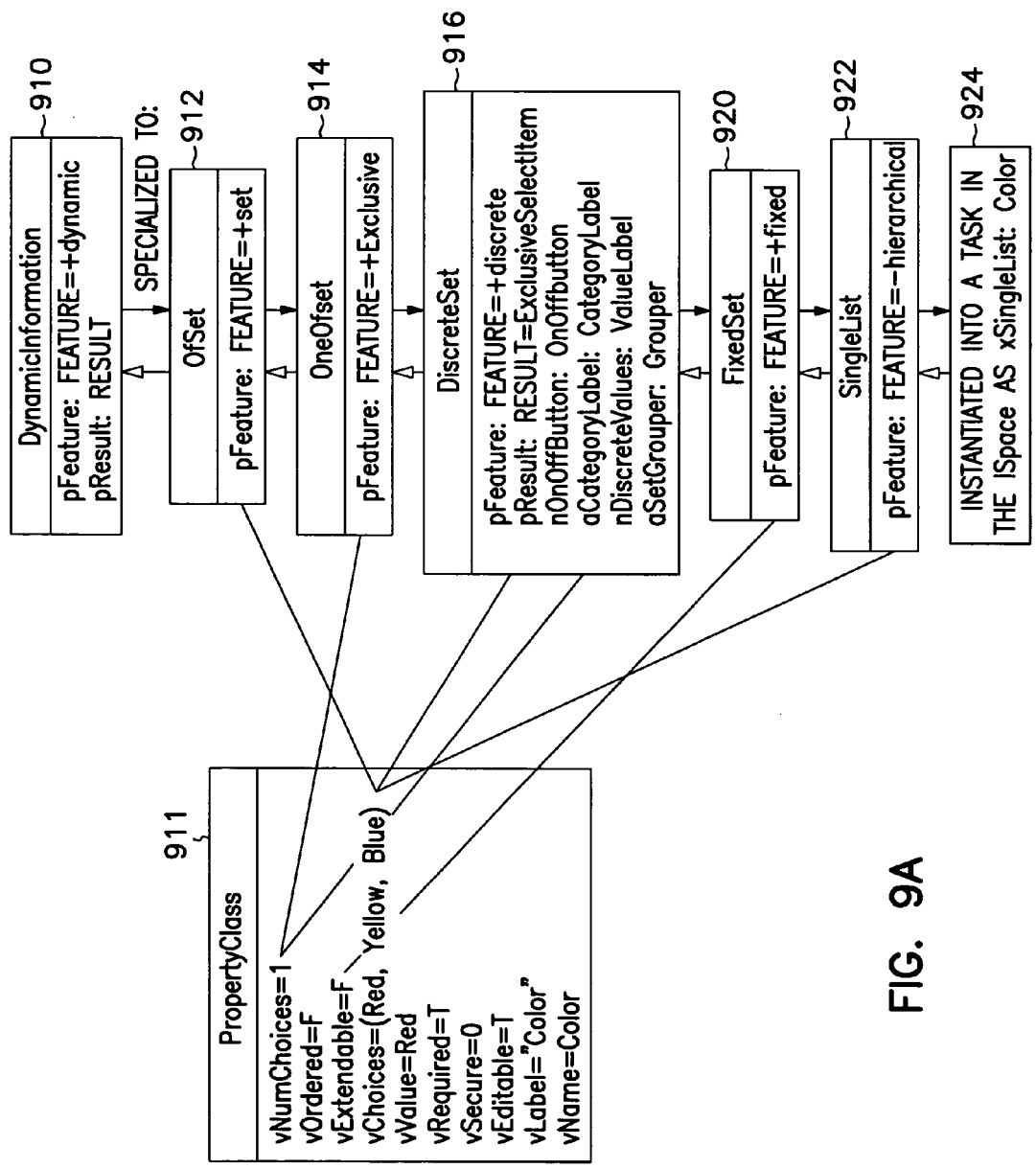
FIGS. 9A and 9B are a block diagram representation of a run time specialization of a component.
Figure 9B:
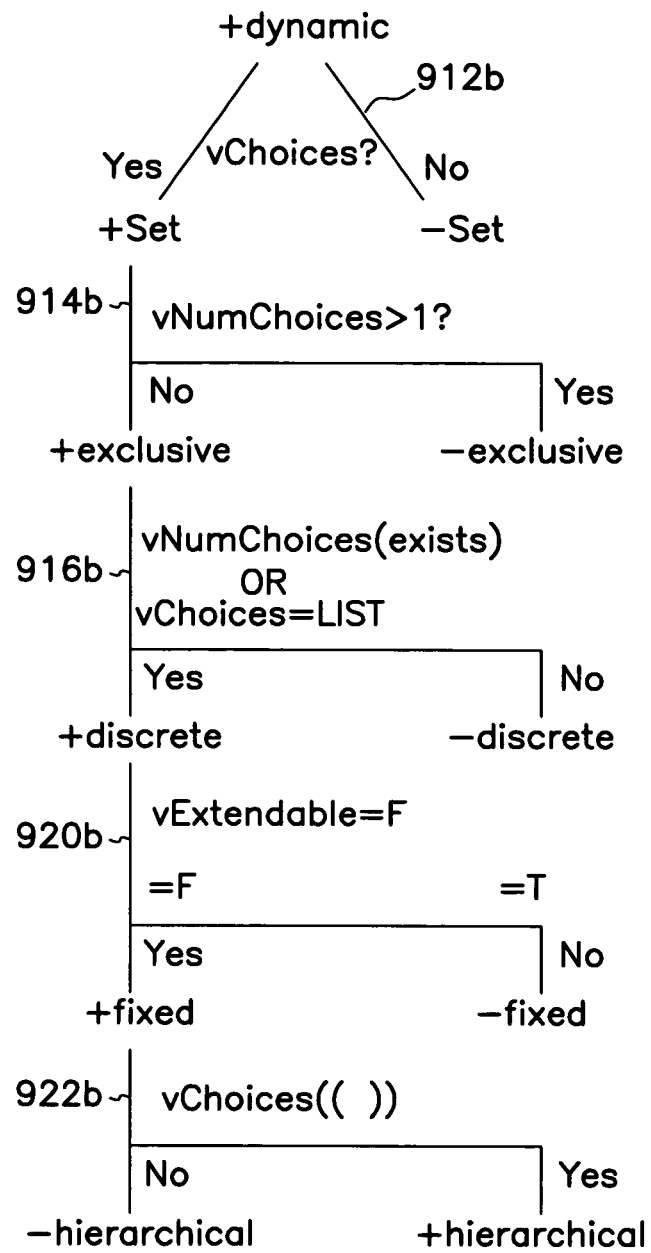

An example of a runtime specialization of a component is shown in FIG. 9A. An abstract DynamicInformation class 910 is matched to various parameters of a data object represented at 911. The data object contains many variables having to do with the color of a thing being represented, such as an airplane in the display of FIG. 2. Further detail of the choices made at each component in FIG. 9A is shown in FIG. 9B, with numbering done consistently with the letter "b" following the number used in 9A corresponded to the block at which the choice is made. The path selected is indicated by the variable Feature being set to one of the choices indicated at each component level in FIG. 9B. Because the value of the data is one of a set of known choices, the DynamicComponent 910 is specialized to an OfSet component 912, 912b. Because the choice is exclusive, it is specialized to a OneOfSet component 914, 914b and so on through a DiscreteSet component 916, 916b, FixedSet 920, 920b, and SingleList 922, 922b until, a task in the ISpace is instantiated as xSingleList:Color as indicated at 924. Eventually, this may be realized on a display screen through the Techs/modules as a set of radio buttons or a drop down list on a display screen or as verbally presented menus on a telephone presenting the currently selected value of the data object.

DiscreteSet component 916 contains n OnOffButton primitives, which is determined with reference to the data object 911 wherein the number of choices is seen as three, Red, Yellow and Blue. Perhaps better color selections are available, but the choices are more than adequate for use as an example. Further references to the data object utilized in the specialization of components are indicated by the lines shown between the components and the variables in the application object 911.

The model also provides the ability to enter the model at any node, as described above, based on the interaction need, and create an interface specification down through the compositional hierarchy starting at that node. For example, given a need for a particular UIInteraction, such as a trend display, the constituent UIComponents, and the individual UI Primitives are automatically generated and assigned the proper values, labels and relationships without further intervention.

This instantiation cascades through the elements that are defined as the compositions of each class, and the required model elements are instantiated, referenced and specialized. Each class and object knows how it is composed. Abstract elements are resolved where necessary by matching properties of more specific elements with properties of the data objects they will represent. At each step, the currently instantiated object investigates its owners and context, and sets its parameters, including its relationships to real world process objects according to the situation it is in.

The technician, first referred to at 316 and 318 is a code module responsible for realizing interactions on an interaction device set, which consists of one or more input and output devices such as microphone/speakers, keyboard/monitor, etc. The technician or technicians know how to convert instantiated, concrete interaction objects in the interaction space into the user interface toolkit suitable for its associated device set. For example, JavaTech 316 converts a single list element into a group of radio buttons while the SpeechTech 318 will convert it into a spoken telephony menu.

Techs can also interpret human interactions with the presented user interface objects into changes to the interaction space and report them back to the InFac 314. When the user interacts with the user interface presentation, the interaction space objects know what actions to take, such as invoke a display need like "Show my controls" or "Graph my past trend values", or an application need, like "Turn on this fan" in the case of a building management application. These requests are generated by the user interface objects when the user interacts with the system. They are then interpreted as interaction space changes by the tech, and acted on by InFac. If the need is strictly a display need, it is handled within the Interaction Management Team through modifications to the interaction space. If it is an application need, it is relayed to external agents that can meet the need.

Within a multi-agent system, the interaction management team, specifically InFac, generates interaction needs and user information needs that are fulfilled by other agents, and itself fulfills needs from external agents. The interaction needs are determined by the user's current context and tasks, and as a reaction to the requests received from other agents.

For example, suppose the user wishes to monitor a thermostat's set-point and the measured room temperature over time, and indicates this by selecting a button displayed by the JavaTech. The button rendered by the JavaTech corresponds to an instantiated ObjectItem representing the thermostat within the interaction space.

The Tech informs InFac of the user's action in the context of this class, and InFac responds by managing the content and structure of the current interaction space. If follows established best practices process heuristics to select a required task or interaction within a task, and requests the appropriate interaction element to instantiate itself as a representation of a particular process object.

At this point, without knowing the specific data to be displayed, InFac can only resolve the interaction object to an abstract class within the interaction space. InFac also determines that the information needed to maintain this on-going interaction—the temperature and setpoint—are provided by an external agent. On receiving the data, InFac can resolve the abstract object into a concrete one by matching the properties of the data with the features of interaction elements. In the case of the thermostat, the multiple instance of time-value data which represent past static value information are determined to require a ValueOverTime trend display.

This results in a fully specified interaction-space model, where each level knows the information relevant to create itself and to realize the interaction. For example, a pushbutton knows what action request to send back to in Fac and how to label itself. A menu knows how to order itself, and a navigation frame knows what application is being presented for navigation. In the thermostat example, a ValueOverTime trend display knows what data to display, how to label its axes, and so on. In this way, InFac causes changes to interaction space for an on-going application through creation or modification of user interface elements at various levels.

Finally, InFac sends a message to the JavaTech to realize the ValueOverTime object. The JavaTech uses details of the instantiated object to determine specifics of the trend graph to display the minimum and maximum bounds for the temperature and the length of the time axis, for example. The JavaTech also begins monitoring the interaction space object for changes. For example, as the temperature or setpoint changes as time passes, InFac updates the interaction space object to reflect this, which in turn, causes the JavaTech to update its display of the trend.

Figure 10:
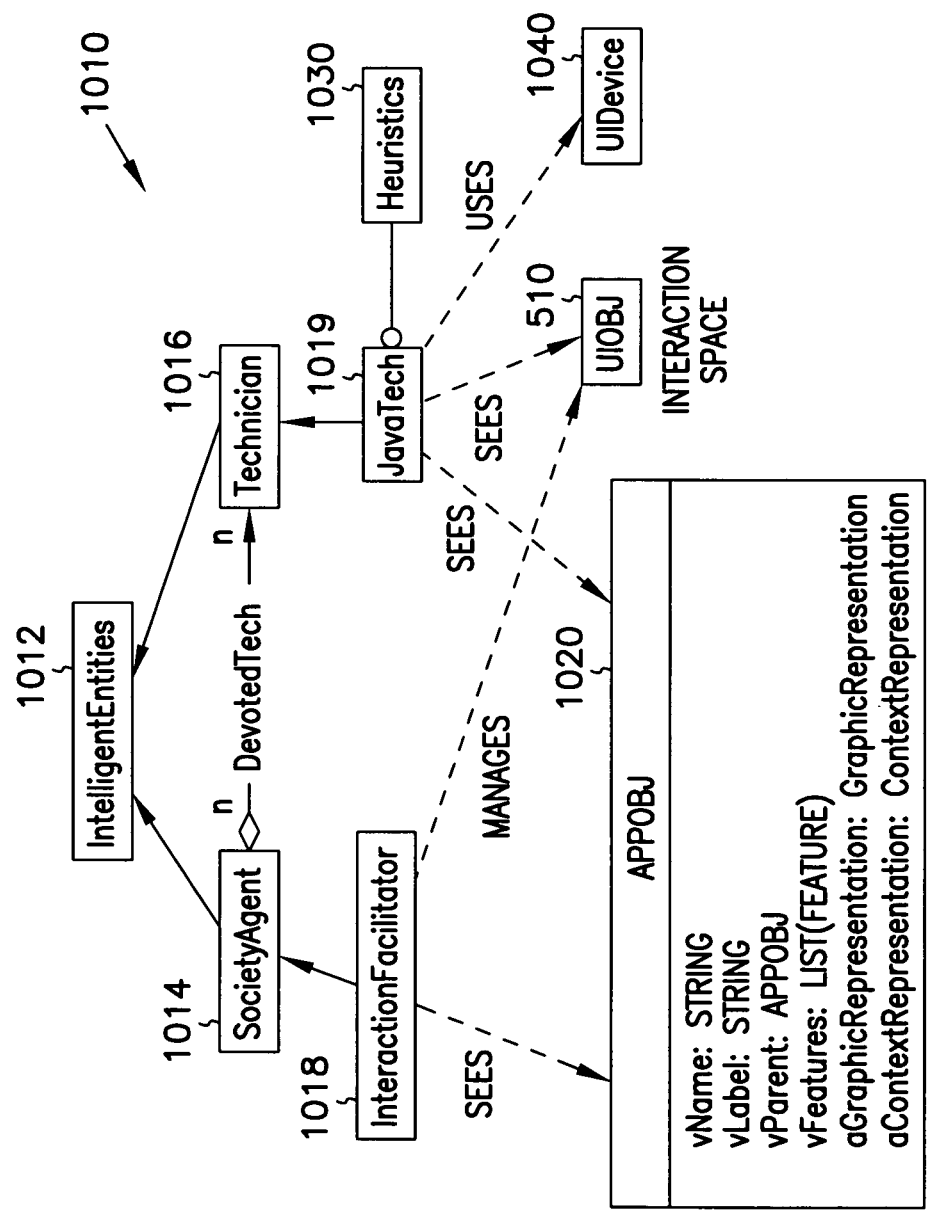
FIG. 10 is a block diagram representation of the class model diagram of interaction management authorities.

A class model diagram of interaction management authorities is shown in block form in FIG. 10 generally at 1010. A root node for software modules is shown as represented at 1012. A prototype parent class indicated as SocietyAgent 1014 has InFac 314 as a specialization and also a member of an Interaction Facilitator class 1018. Similarly, a Technician 1016 parent class has a subclass JavaTech 1019 of which JavaTech 316 is a member. Broken lines are now used to indicate the relationships of these classes to other objects. The highest level of application object is represented at 1020 as APPOBJ having several variables and primitives. The interaction space is represented at 510 and labeled UIOBJ, and a UIDevice is indicated at 1040. Further, a box labeled Heuristics 1030 comprises a lookup table containing knowledge of device capabilities indicating how to map elements to the device.

Instances of the InteractionFacilitator class 1018 may only read information from APPOBJ 1020, while having the ability to manager the interaction space 510. Instances of the JavaTech class 1019 again may only see APPOBJ 1020 in order to obtain needed information. This ensures that the interface designer cannot change the application, but only react to it. The JavaTech 1019 instances can only see the interaction space 510, but uses the UIDevice 1040, providing it the information and controls necessary to properly implement the dynamically designed interface utilizing the heuristics 1030.

Figure 11A:
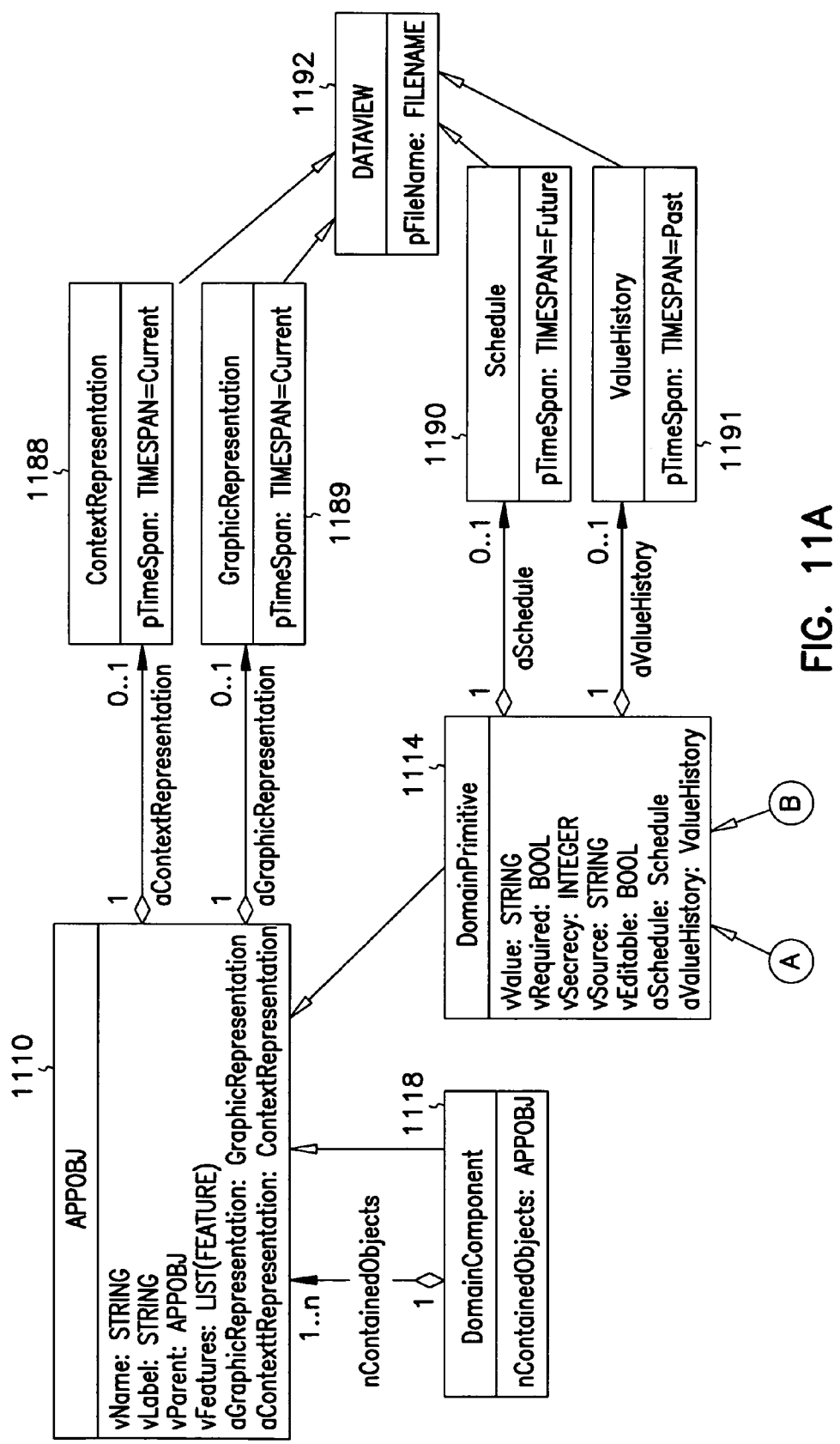
FIG. 11 is a block diagram representation of the application data model.
Figure 11B:
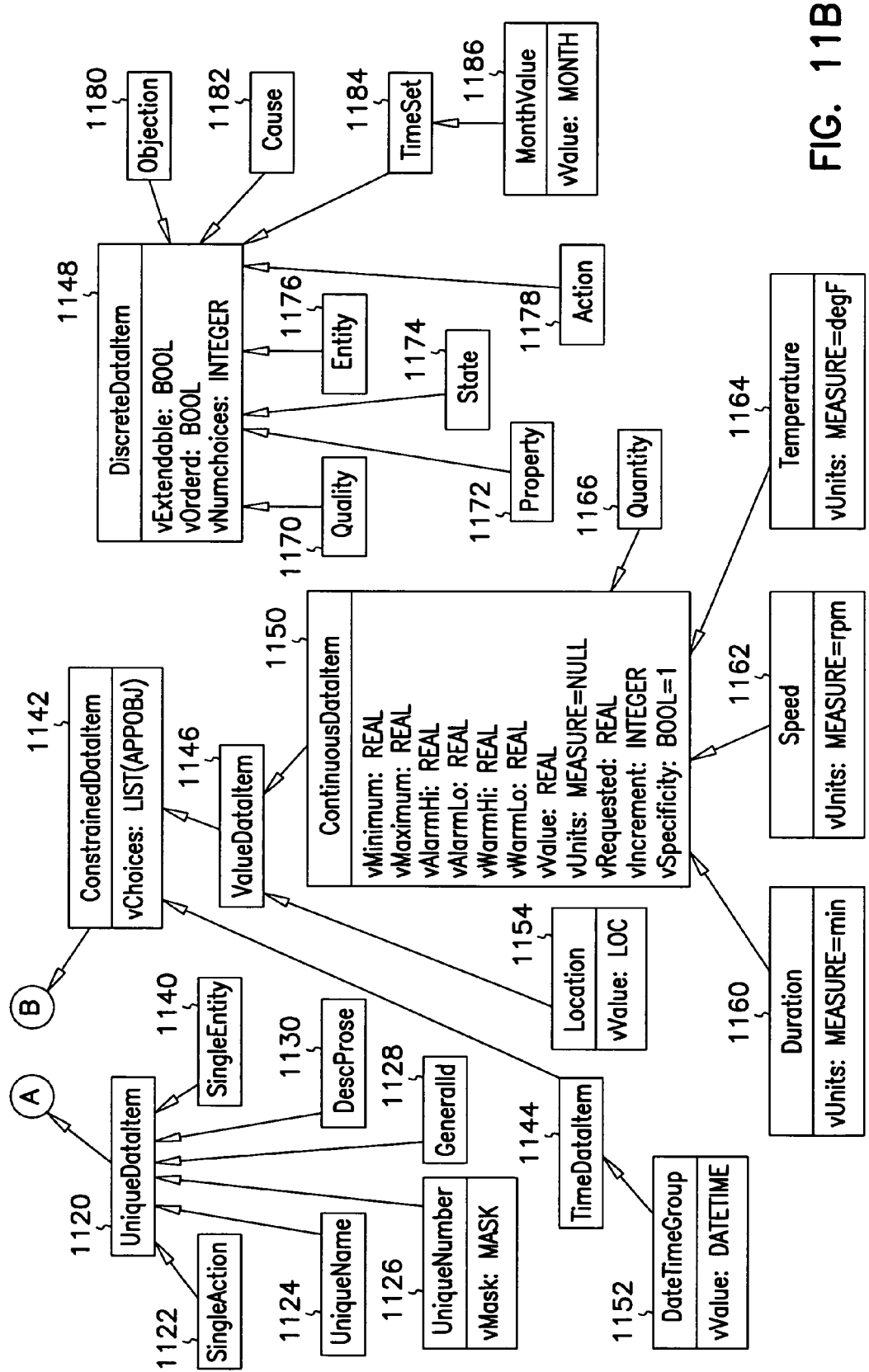

An application object domain model is shown in FIG. 11. A generic application object is shown at 1110 with variables and primitives. Two specializations of the generic APPOBJ object 1110 comprise a DomainComponent 1118 and a DomainPrimitive 1114. Each DomainComponent 1118 is composed of one or more APPOBJ objects. DomainPrimitive 1114 is specialized into UniqueDataItem 1120 or ConstrainedDataItem 1142. UniqueDataItem 1120 is instantiable into leaf nodes SingleAction 1122, UniqueName 1124, UniqueNumber 1126, GeneralID 1128, DescProse 1130 or SingleEntity 1140. ConstrainedDataItem 1142 is further specializable into TimeDataItem 1144, ValueDataItem 1146 or DiscreteDataItem 1148. TimeDataItem 1144 is instantiable into leaf node DateTimeGroup 1152. ValueDataItem 1146 is instantiable into leaf node Location 1154 or may be specialized into ContinuousDataItem 1150 which is instantiable into leaf nodes Duration 1160, Speed 1162, Temperature 1164 and Quantity 1166. Leaf nodes Duration 1160, Speed 1162, and Temperature 1164 each have a variable for Units. ContinuousDataItem 1150 also has several variables listed, including the Units variable which is defaulted to Null. The other variables include minimum and maximums, alarm and warning limits and other variables which are declared to be real, integer or boolean as shown. DiscreteDataItem 1148 is further instantiable into leaf nodes Quality 1170, Property 1172, State 1174, Entity 1176, Action 1178, Objective 1180, and Cause 1182. It is also specializable into a TimeSet 1184 with leaf node MonthValue 1186. Each of the leaf nodes described provide information or allow for an interaction with a user.

There are also several leaf nodes representing files of information used by the Domain model. These comprise ContextRepresentation 1188, GraphicRepresentation 1189, Schedule 1190 and ValueHistory 1191, each of which are leaf nodes of an abstract class DATAVIEW 1192 having a parameter Filename indicating the address of the files. ContextRepresetnation 1188 and GraphicRepresentation 1189 are referenced by the generic application object, and hence available to all objects in the model. The Schedule 1190 and ValueHistory 1191 leaf nodes are referenced by the DomainPrimitive class, and are available to it and classes of which it is comprised.

Figure 12:
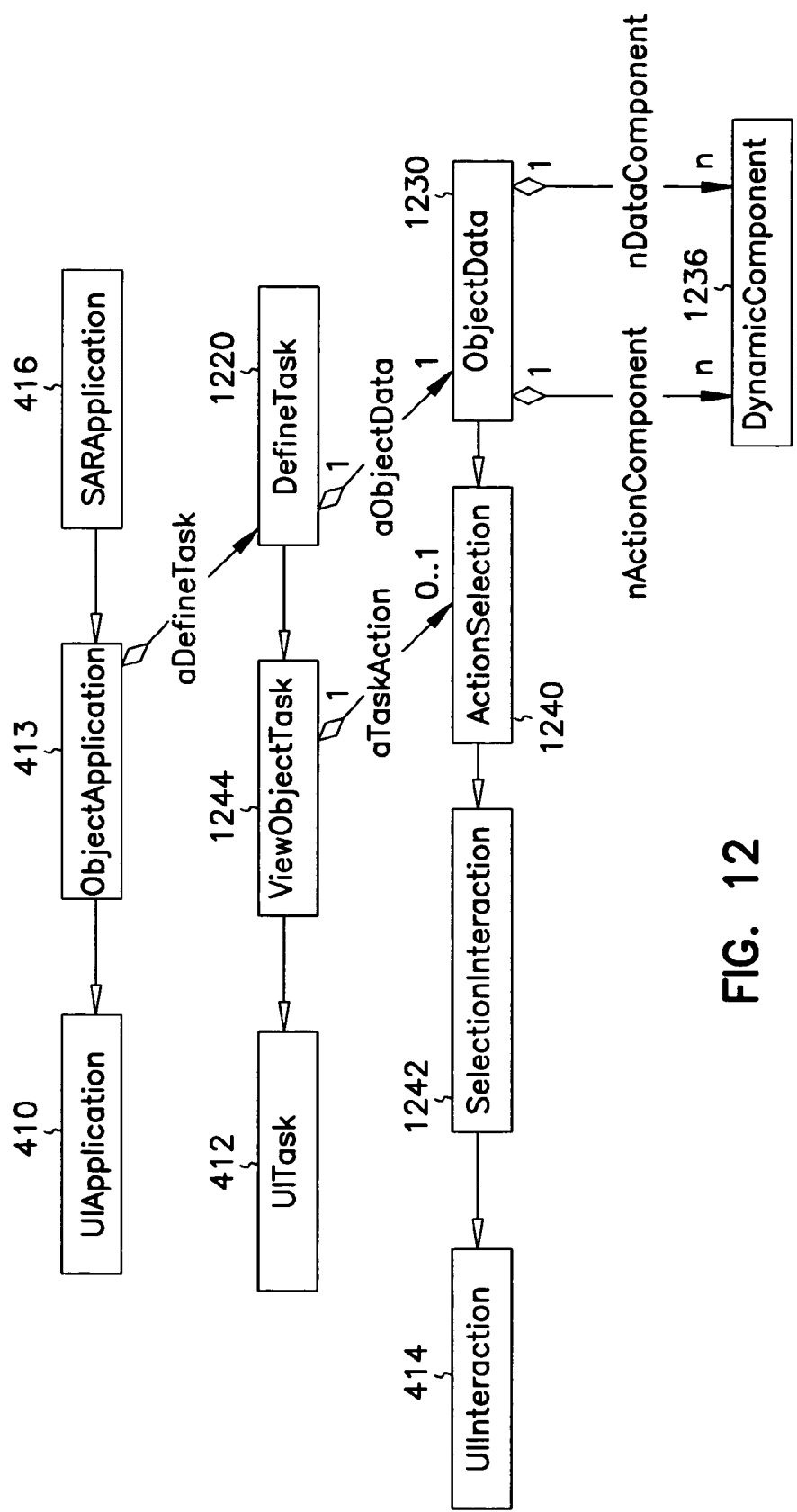
FIG. 12 is a block diagram representation of steps performed in the first three compositional levels of FIG. 4 during generation of an interaction space.

One further example of the generation of an interaction space is shown in FIG. 12. This is an example of the generation of a search and rescue report, as shown in FIG. 2. Only the first three levels of the interaction space are shown, the UIApplication level 410, the UITask level 412 and the UIInteraction level 414. The search and rescue application is represented by the block labeled ObjectApplication at 415 which is a specialization of UIApplication 410. The current mission is indicated at 416 as a specialization of ObjectApplication 415. ObjectApplication 415 is composed of a DefineTask object 1220 which is a specialization of a ViewObjectTask 1224, which is further specialized from the UITask class 412.

DefineTask 1220 is further composed of a an ObjectData subtask 1230 which itself is composed of multiple DynamicComponents 910. ViewObjectTask 1244 is further composed of an ActionSelection subtask 1240, which itself is also composed of multiple DynamicComponents 910. The ActionSelection subtask 1240 is a specialization of a SelectionInteraction subtask 1242, which is specialized from SubTask 414.

The report may be completed by the agents assisting the search and rescue process, the form must be reviewed and authorized by a human user before being submitted. When authorization of the report is required, a display need is generated for the form. InFac attempts to meet the need by notifying the user that it would like to interrupt the current task if necessary and present the report approval. When the user concurs, InFac determines that the search and rescue information is categorized as of the definition type, and begins instantiating a DefineTask object 1220 in the interaction space. The search and rescue data is then used to specialize each level of the hierarchy as described with reference to FIG. 9.

The Define Task is made up of a single ObjectData Interaction 1230. After setting its own properties such as its owner, etc., the newly instantiated search and rescue Define Task sends a message to the ObjectData Interaction Class to create itself, resulting in a search and rescue ObjectData Interaction.

Since the specific content of the search and rescue form cannot be determined in advance, the Data Interaction objects need to resolve their compositional structure to determine how many individual Components they need. For example, information fields pertaining to aircraft data are not relevant if the situation involves a submarine. This will be reflected in the search and rescue data and, consequently, can only be determined based on the specific situation.

Once the number of components are determined, the search and rescue Data Interaction object creates the Dynamic Component class 1236 for each required field. Because a Dynamic Component is an abstract class, details of the search and rescue fields are matched to the defining properties for dynamic components to resolve it into concrete classes. A process analogous to that takes place for each search and rescue field to create the required components in the Interaction Space.

In one example, the aircraft color field 222, which is currently set as "Orange", but has allowable values "Blue|Orange|Red|Green" may be part of the form. Based on the defining parameters of the data, the Dynamic Component is resolved into a SingleList Component (see FIG. 9), which is composed of four OnOffButton Primitives (one for each allowable choice), with the one representing "Orange" having a selected state and the others having an unselected state, four ValueLabel primities (one to label each allowable choice), a CategoryLabel Primitieve for the field label "Aircraft Color", and a Grouper Primitive to bound the component. The Information Label of the SingleList Component is not required, since the Aircraft Color property has no engineering units. Each of these Primitives are created as they are determined.

When the interaction space is completed for this display need through the process described above, the Interaction Facilitator directs the Tech to generate the search and rescue situation report for the user who must review it. The Tech will generate the report based on the user, the available hardware and the Tech's own knowledge. For example, the report might be presented as a displayed form on a screen, or a faxed hardcopy might be sent to a remote user via available means.

As the application of the DIG process to search and rescue shows, it is possible to use dynamically changing task and display requirement to compose on-line designs of user interactions. Because it is generated in direct response to the properties of the data and the user, a DIG based interaction is inherently dependent on the situation, centered on the user and the task, and preferably firmly rooted in the principles of good user interface design.

DIG benefits both developers and user of mixed initiative assistive systems. Developers are assured good design and a consistent look and feel to applications. Products can rapidly and easily modify and create user interfaces to their system through modification of the DIG interaction models. Reuse and automatic documentation capabilities help reduce development costs and effort. Incremental advances in computing capabilities, languages and infrastructures can quickly be used to enhance products.

A further advantage of the invention is that users are not required to perform laborious interface definition and configuration. They are automatically provided with well designed state of the art user interfaces. They also feel more in control and connected to their tasks with a consistent interface over varying situations. Upgrades and model evolution are provided with dynamic responsiveness to context, task, situation and user intentions without the need for retraining and support.

It is to be understood that the above description is intended to be illustrative, and not restrictive. Services may be implemented in hardware, ASICs or software or any combination thereof. When the services and methods are implemented in software, they may be stored in any available computer readable medium as represented at 130, and executed normally from a random access memory associated directly with a processor. Such computer readable medium includes disk dives, floppy drives, CD ROM, tape, and even includes remote storage devices such as that accessible via network. Further object oriented models which basically encapsulate data and programming into identifiable files may also be utilized. The invention was described with respect to a model having five levels. It is easily contemplated that models having a different number of levels may be used without departing from the scope of the invention. While many of the embodiments have referred to a user as a person, it is clear from the description that a user may also be another program or object. In that case, the interfaces used may be program to program interfaces. Such interfaces, when synthesized dynamically based on needs may help conserve system resources such as main memory, which will help applications run faster and more efficiently. Many other embodiments will be apparent to those of skill in the art upon reviewing the above description. The scope of the invention should, therefore, be determined with reference to the appended claims, along with the full scope of equivalents to which such claims are entitled.

*Interaction Model Report*

*Unified Modeling Language Syntax*

*Includes Attributes And Operations*

*Includes Documentation*

Robin R. Penner

*Generated 12/24/97*

CATEGORY STRUCTURE

SARDIG
    UIApplications
        UITasks
        UISubTasks
        UIComponents
        UIPrimitives
        InteractionClasses
    VarTypes
    DomainClasses
    InteractionManagement

INTERACTION MODEL

InteractionClasses

*The Interaction Classes category holds the root class in the DIG model, UIOBJ. All objects in an Interaction-Space are specializations of UIOBJ.*

UIOBJ

This is the root node for the DIG class model. All Interaction Classes know how to Create themselves; if they are abstract classes and can't be instantiated until they are concretized, they trap the CreateSelf operation and send it on to their most appropriate specialization. Concrete classes pass the CreateSelf through their UI Category parent and on to this root node, who executes the instantiate of the concrete class by setting it's vReferent, vOwner, and vUIName, executing any category-specific operations, determining the number of sub-components the object has, setting its vOwns, and sending CreateSelf operations down to each of the sub-component classes. Terminal category classes (UIPrimitives) execute their own internal operations instead of instantiating sub-components.

Public Properties:

vReferent : OBJ
    Every object in the Interaction-Space has a vReferent of type REFERENT which is the object in the real world the ISObject "refers" to. Usually it is an object in the Domain Model. The constructor function is passed the referent as the second argument.

vOwner : UIOBJ
    Every object in the Interaction-Space has a vOwner. The vOwner of the root node of the space (the UIApplication object) is owned by itself. Except for the root node, all objects are owned by the next higher category; e.g., applications own tasks; components own primitives. The constructor function is passed the name of the owner as the third argument.

vOwns : LIST(UIOBJ)
    Every object in the Interaction-Space except UIPrimitive terminal nodes have a list of UIObjects that are contained within themselves. This list is set after the set of children is resolved at the category level, and

LOGICAL VIEW REPORT synchronized after all children are instantiated to accommodate specialization that occurs after the initial number of children is determined.

vUIName : STRING
Every object in the Interaction-Space is given a UIName when it is instantiated. This is passed in the constructor function as the first argument of CreateSelf.

pFeature : FEATURE
Every class in the UIOBJ hierarchy has a pFeature attribute which distinguishes it from siblings at the same level which are specializations of the same parent, to allow classes have unspecialized sub-classes until instantiation. For example, the pFeature of a OneOfSet UIComponent that distinguishes it from an NOfSet UIComponent is the feature +exclusive.

Public Methods:

CreateSelf (UIName : STRING = default, Referent : REFERENT = default, UIParent : InteractionClassRoot = default) :
The CreateSelf of a concrete UIObject is not trapped by the object or its category, but is perpetuated up to the root node.

```
CreateSelf (UIName, Referent, UIParent)
  set my pUIName
  set my pReferent
  set my pOwner
  perform category operations
  set initial pOwns
  send CreateSelf to each of my children (pOwns)
  update pOwns for specializations
end CreateSelf
```

UIApplications

*The UIApplications category is the highest level category, representing an application as a set of related tasks performed on the same data. UIApplications are composed of UITasks.*

UIApplication

*UIApplication is the root node of the application category. It holds an application (from the user's point of view): a coherent grouping of related tasks on a set of data that the user views as related and interdependent. A set of tasks required to manage a search and rescue operation, or to manage a building, or to provide point-of-request information systems, for example.*

Derived from UIOBJ

Public Properties:

vDataFileName : FILENAME
vDataFileName is set when the application is first instantiated, and refers the the pathname of the domain data records for the application. When referring to the data of their actual referents, individual objects will append the referent name to this filename.

LOGICAL VIEW REPORT pFeature : FEATURE = +application

Public Methods:

SetFileName () :
> SetFileName sets the path for the entire application's data. Hard code for SAR; for example: <appname>.dbs, <appname>.grc. The filename is used by the individual objects to set their referents, and in future to get additional data like report formats and such.

SARApplication

A specialization of the UIApplication --> Object Application classes for the joint forces search and rescue domain.

Derived from ObjectApplication

ObjectApplication

Object applications are specializations of UIApplications that have the task set required to support a dynamic object base that represents a dynamic process that can be controlled (rather than just observed). There are two conversation tasks: user and system dialogs; four global (application) tasks: initiate a conversation, overview the system, select a domain object, select a view of a domain object; four object specific tasks: define object, view object history, view object plan, view object's sub-components and/or super-components.

Derived from UIApplication

HasA Constituents:
aSystemOverview : OverviewSystem
aAppObjectList : SelectAppObject
aViewList : SelectView
aDefineTask : DefineTask
aHistoryTask : HistoryTask
aPlanTask : PlanTask
aRelationshipTask : RelationshipTask
aUserDialog : UserInitiatedDialog
aSystemDialog : SystemInitiatedDialog
aDialogManager : ConversationInitiation

UITasks

The UITasks category contains the specialization hierarchy for the task level of the Interaction-Space. UITasks are akin to things like plan and monitor. UITasks are composed of UISubTasks, and themselves compose UIApplications.

UITask

UITasks are the main pieces of an application. They correspond to different views of data and global interaction management functions: present values (define), present context (relationship), past values (history), select view, initiate conversation, etc.

Derived from UIOBJ

Public Properties:

pFeature : FEATURE = +task
> The pFeature is an attribute of all classes of UIOBJ.

pContext : CONTEXT
> The pContext of a UITask is the type of object the referent of the task is: a SarApplication or a SARObject.

LOGICAL VIEW REPORT pFormat : FORMAT
   The pFormat of a UITask is the general format of the task in the prototypical case. The pFormat for a global task is Choices, for a conversation task a dialog.

pTimeSpan : TIMESPAN
   The pTimeSpan of a UITask is the timespan in which the task data occur, relative to now: Past, Current, Future.

GlobalTask
*Global tasks manage the view object tasks globally, by presenting sets of process space objects and process space views, and an overview of the entire process space.*

Derived from UITask

Public Properties:
pFeature : FEATURE = +application
pContext : CONTEXT = APP
pFormat : FORMAT = Choices
pTimeSpan : TIMESPAN = Current

OverviewSystem
*Overview system provides a view of the entire set of process space objects.*

Derived from GlobalTask

Public Properties:
pfeature : FEATURE = +status

HasA Constituents:
aObjectData : ObjectData

SelectAppObject
*Select Application Object task allows selection of a specfic object in the process space.*

Derived from GlobalTask

Public Properties:
pFeature : FEATURE = +objects

HasA Constituents:
aObjectSelection : ObjectSelection

SelectView
*Select view tasks provide selection of a specific view available for a specific object in the process space.*

Derived from GlobalTask

Public Properties:
pFeature : FEATURE = +views

HasA Constituents:
aViewInvoker : InvokeView

ConversationInitiation
*Manage dialog tasks allow user to initiate a user initiated or other kind of dialog.*

LOGICAL VIEW REPORT

Derived from GlobalTask
Public Properties:
pFeature : FEATURE = +discourse
HasA Constituents:
aTopicSelection : TopicSelection

ViewObjectTask
*View object tasks involve taking a particular point of view towards a specific object in the process space.*

Derived from UITask
Public Properties:
pFeature : FEATURE = +object
pContext : CONTEXT = OBJ
pFormat : FORMAT = Frame
HasA Constituents:
aObjectToViewSelection : ObjectSelection
aTaskActionSelection : ActionSelection
aViewDismisser : DismissView

PlanTask
*Plan tasks view objects from the perspective of future behavior.*

Derived from ViewObjectTask
Public Properties:
pFeature : FEATURE = +plan
pFormat : FORMAT = Trend
pTimeSpan : TIMESPAN = Future
HasA Constituents:
aItemOverTime : ItemOverTime
aTimeSelection : TimeSelection

HistoryTask
*History tasks view an object as a set of past time stamped data.*

Derived from ViewObjectTask
Public Properties:
pFeature : FEATURE = +review
pFormat : FORMAT = Trend
pTimeSpan : TIMESPAN = Past
HasA Constituents:
aItemOverTime : ItemOverTime
aTimeSelection : TimeSelection

DefineTask
*Define tasks view an object as a set of components and values.*

LOGICAL VIEW REPORT

Derived from ViewObjectTask

Public Properties:
pFeature : FEATURE = +definition
pFormat : FORMAT = Form
pTimeSpan : TIMESPAN = Current HasA Constituents:
aObjectData : ObjectData

RelationshipTask

*Relationship tasks take the point of view of the subcomponents of an object and their relationships to each other (a 2D map, generally)*

Derived from ViewObjectTask

Public Properties:
pFeature : FEATURE = +context
pFormat : FORMAT = Map
pTimeSpan : TIMESPAN = Current HasA Constituents:
aItemRelationship : ItemRelationship

ConversationTask

*Conversation tasks support discourse between human and computer collaborators.*

Derived from UITask

Public Properties:
pFeature : FEATURE = +meta
pContext : CONTEXT = APP
pFormat : FORMAT = Dialog
pTimeSpan : TIMESPAN = Current HasA Constituents:
aGlobalActionSelection : ActionSelection

SystemInitiatedDialog

*A conversation task that is initiated by the system.*

Derived from ConversationTask

Public Properties:
pFeature : FEATURE = +systemtouser

HasA Constituents:
aDiscourse : DiscourseInteraction

UserInitiatedDialog

*User dialogs are dialogs that are initiated by the user through the ConversationIntiation Global task.*

Derived from ConversationTask

Public Properties:
pFeature : FEATURE = +usertosystem

HasA Constituents:
aDiscourse : DiscourseInteraction

LOGICAL VIEW REPORT

UISubTasks

*The UISubTasks category is the specialization hierarchy for the basic interactions in a UI. They are akin to the level of trend graphs, schematis, and task bars in a graphical UI. UISubTasks are made up of UIComponents and themselves make up UITasks.*

UISubTask

*UISubTask is the root node of the SubTask category in UIOBJ. It contains the subtasks within the tasks within the application, and is composed of UIComponents.*

Derived from UIOBJ

Public Properties:

pContext : CONTEXT = OBJ
   pContext is a fixed attribute of all UISubTasks. The pContext of a
   UISubTask is the type of domain object or domain subobject that can
   be referenced by this subtask. For example, the pContext of an
   ItemOverTime is the value parameter of an application object; for a
   definition interaction it is the subcomponents of an application object.

pFeature : FEATURE = +subtask

Public Methods:

ResolveChildren () :
   n = number of SARPrimitives contained in the SARComponent designated by the
   pReferent of this Interaction. It is resolved as the number of Domain Primitives owned by
   this Domain Component that have the same feature as the pFeature of the task; for
   example, the SARComponent "SARIRForm" has x SARPrimitives as children. The
   SARPrimitives that represent the sub-components of the form are marked +data and so are
   shown in the ObjectData Interaction.

DiscourseInteraction

*Discourse interactions between the user and the system.*

Derived from UISubTask

Public Properties:
pFeature : FEATURE = +communication

HasA Constituents:
nDiscourseComponent : DynamicInformation

ContextInteraction

*The context interaction class shows the relationships of an application object.*

Derived from UISubTask

Public Properties:
pFeature : FEATURE = +relationship

HasA Constituents:
aContext : Contextual

ItemRelationship

*The Item Relationship class shows the subobjects of an appobject; the relationship of the item to it's parts.*

Derived from ContextInteraction
Public Properties:
pFeature : FEATURE = +subobject
HasA Constituents:
nRelationshipComponents : DynamicInformation

DefinitionInteraction
*The definition interaction shows the data for an application object. The only data currently defined is the data for the object's sub-objects (the ObjectData concrete class), which is akin to a form with fields labelled with each of the sub-objects and containing the value of the sub-object.*
Derived from UISubTask
Public Properties:
pFeature : FEATURE = +item

ObjectData
*Object data interactions are definition interactions that show the values of an application object's subobjects.*
Derived from DefinitionInteraction
Public Properties:
pFeature : FEATURE = +value
HasA Constituents:
nDataComponent : DynamicInformation
aCurrentValue : SingleValue

ItemOverTime
*The item over time shows the relationship of the domain object's parameeter value(s) to past or future time.*
Derived from DefinitionInteraction
Public Properties:
pFeature : FEATURE = +overtime
HasA Constituents:
aLegend : Legend
aAxesSet : Axes
aCurrentValue : SingleValue

SelectionInteraction
*A selection interaction is in the context of an application object where the feature is some type of choice. There are four types currently defined: action choice, object choice, time choice, topic choice.*
Derived from UISubTask
Public Properties:
pFeature : FEATURE = +choice

ActionSelection
*The action selection subtask provides the choice of an action within the context of an application object*

LOGICAL VIEW REPORT

Derived from SelectionInteraction
Public Properties:
pFeature : FEATURE = +action
HasA Constituents:
nActionComponent : DynamicInformation

ObjectSelection
*The object selection subtask provides for the selection of an object from a list of objects that are related to one another.*
Derived from SelectionInteraction
Public Properties:
pFeature : FEATURE = +object
HasA Constituents:
aObjectHierarchyList : HierarchicalList

TimeSelection
*The time selection subtask provides the capability to select a time period within which to view information.*
Derived from SelectionInteraction
Public Properties:
pFeature : FEATURE = +time
HasA Constituents:
aTimeValueSelector : SpecificTimeValue

TopicSelection
*The topic selection allows the choice of all the domain primitives defined for the current object that are coded as +topic*
Derived from SelectionInteraction
Public Properties:
pFeature : FEATURE = +topic
HasA Constituents:
aTopicList : DiscreteSet

ViewInteraction
*The view interaction class provides a way to invoke and dismiss view tasks as component parts of the view; the specializations are invoke the view and dismiss the view.*
Derived from SelectionInteraction
Public Properties:
pFeature : FEATURE = +view
HasA Constituents:
nViewAction : ActionItem

InvokeView
*Provides a method to invoke a view on an object.*

Derived from ViewInteraction
Public Properties:
pFeature : FEATFURE = +invoke

DismissVIew
*Provides a way to dismiss a view of an object.*
Derived from ViewInteraction
Public Properties:
pFeature : FEATURE = +dismiss

UIComponents

*The UIComponents category contains the specialization hierarchy for the component level, akin to the widget level in a graphical user interface. UIComponents are composed of UIPrimitives and themselves compose UISubTasks.*

UIComponent
*A UIComponent is the root node of the UIComponent category. UIComponents appear within UISubTasks and are composed of UIPrimitives.*
Derived from UIOBJ
Public Properties:
pFeature : FEATURE = +component
    The pFeature of a UIComponent is the feature that is used to specify an abstract component into a more concrete component.

pResult : RESULT = NULL
    The pResult of a UIComponent is the result of invoking that component in the UI context.

Public Methods:
ResolveChildren () :
    UIComponents resolve the number of children for three classes: NOfSet, Discrete, and LargeFixedSet. For Separator primitives, there is one separator for each subgroup of objects; for other prrimitives, n = the number of items in the set.

DynamicInformation
*A dynamic information component is a UI Component that represents data, rather than context, and is therefore potential changable in some way or another.*
Derived from UIComponent
Public Properties:
pFeature : FEATURE = +dynamic
pResult : RESULT
Public Methods:
CreateSelf () :
    If exists(vReferent : vChoices) then feature = +set --> OfSet; else -set --> IndividualItem

IndividualItem
*An individual item is an action or an object.*

LOGICAL VIEW REPORT

Derived from DynamicInformation

Public Properties:
pFeature : FEATURE = -set

Public Methods:
CreateSelf () :
    if pReferent: ClassType contains "Action", then feature = +action --> ActionItem; else = +object --> ObjectItem HasA Constituents:
aItemName : ValueLabel
aItemType : CategoryLabel

StateItem

Derived from IndividualItem

Public Properties:
pFeature : FEATURE = +state
pResult : RESULT = ChangeState

HasA Constituents:
aStateSelector : OnOffButton

ObjectItem

*Object items are used for individual object selection (a Fan). The select object behavior of an ObjectItem is to show the associated controls when on and hide when off.*

Derived from IndividualItem

Public Properties:
pFeature : FEATURE = +object
pResult : RESULT = SelectObject

HasA Constituents:
aObjectButton : OnOffButton

ActionItem

*Action items are used for individual actions (Print, Acknowledge)*

Derived from IndividualItem

Public Properties:
pFeature : FEATURE = +action
pResult : RESULT = InvokeAction

HasA Constituents:
aItemSelector : SelectorButton

OfSet

*The OfSet classes are interactions where one or more choices is made from a set of choices; e.g., times, dates, extendable or fixed lists, bounded values.*

Derived from DynamicInformation

Public Properties:
pFeature : FEATURE = +set

Public Methods:
CreateSelf () :
    if vNumChoices of my vReferent > 1, then -exclusive --> NOfSet; else +exclusive --> OneOfSet

LOGICAL VIEW REPORT

NOfSet
*List where more than one item can be selected.*
Derived from OfSet
Public Properties:
pFeature : FEATURE = -exclusive
pResult : RESULT = SelectItem
HasA Constituents:
aListTitle : CategoryLabel
nValueLabels : ValueLabel
nOnOffButtons : OnOffButton
aListGrouper : Grouper
nListSeparator : Separator

OneOfSet
*Only one item may be selected from a set of items.*
Derived from OfSet
Public Properties:
pFeature : FEATURE = +exclusive
Public Methods:
CreateSelf () :
 If exists(vReferent : vNumChoices ) then +discrete --> Discrete; else -discrete --> Continuous

Continuous
*A continuous value is a numeric continuous value, usually bounded.*
Derived from OneOfSet
Public Properties:
pFeature : FEATURE = -discrete
pResult : RESULT = ChangeValue
Public Methods:
CreateSelf () :
 if vReferent : vSpecificity = TRUE then +specific -->SpecificValue; else -specific -->RelativeValue
HasA Constituents:
aValueLabel : ValueLabel
aUnitsLabel : InfoLabel
aCategoryLabel : CategoryLabel
aUpSpin : SpinnerButton
aDownSpin : SpinnerButton
aValueEnter : TextEnter

RelativeValue
*A Relative Value provide the entry of a continuous value on a relative scale; "7 more than current", "10 mins from now", "hot".*

LOGICAL VIEW REPORT

Derived from Continuous

Public Properties:
pFeature : FEATURE = -specific

HasA Constituents:
aValueLocator : LocatorButton
aValueAxis : Axis

SpecificValue

*A specific value is stated as an absolute (7 degrees, 12)*

Derived from Continuous

Public Properties:
pFeature : FEATURE = +specific

Public Methods:
CreateSelf () :
  if vReferent isa TimeDataItem then +time --> SpecificTimeValue; else if vReferent isa ValueDataItem then +number --> SpecificNumberValue

SpecificNumberValue

*A specific general number.*

Derived from SpecificValue

Public Properties:
pFeature : FEATURE = +number

SpecificTimeValue

*A specific time value is a specific value that is expressed as a time.*

Derived from SpecificValue

Public Properties:
pFeature : FEATURE = +time

DiscreteSet

*A Discrete is a discrete set of items.*

Derived from OneOfSet

Public Properties:
pFeature : FEATURE = +discrete
pResult : RESULT = ExlusiveSelectItem

Public Methods:
CreateSelf () :
  if vReferent : vExtendable = TRUE then -fixed --> ExpandableSet; else +fixed --> FixedSet HasA Constituents:
nOnOffButton : OnOffButton
aCategoryLabel : CategoryLabel
nDiscreteVAlues : ValueLabel
aSetGrouper : Grouper

ExpandableSet

*An expandable set is a list of discrete items which can have new items added to it.*

LOGICAL VIEW REPORT

Derived from DiscreteSet
Public Properties:
pFeature : FEATURE = -fixed
HasA Constituents:
aNewChoice : TextEnter

FixedSet
*A FixedSet is a list of discrete items which cannot be user-expanded.*
Derived from DiscreteSet
Public Properties:
pFeature : FEATURE = +fixed
Public Methods:
CreateSelf () :
    if the items in vReferent : vChoices contain hierarchy delimiters, then +hierarchical -->
    HierarchicalList; else -hierarchical --> SingleList

HierarchicalList
*A hierarchical list has items organized hierarchically.*
Derived from FixedSet
Public Properties:
pFeature : FEATURE = +hierarchical

SingleList
*A single list has items arranged at a single level.*
Derived from FixedSet
Public Properties:
pFeature : FEATURE = -hierarchical

StaticInformation
*Information that provides context or translation.*
Derived from UIComponent
Public Properties:
pFeature : FEATURE = -dynamic

Axes
*Axes provide context between a continuous or stepped data value and time.*
Derived from StaticInformation
Public Properties:
pFeature : FEATURE = +time
HasA Constituents:
aTimeAxis : Axis
aDataAxis : Axis

Legend
*A legend provides equivalence between one representation of an object and another representation.*

LOGICAL VIEW REPORT

Derived from StaticInformation

Public Properties:
pFeature : FEATURE = +equivalence

HasA Constituents:
aLegendBox : Grouper
aCategoryLabel : CategoryLabel
nReferencedTypes : ValueLabel
nTranslatedTypes : ValueLabel

Contextual

*Context provides a context for information; usually a static graphic.*

Derived from StaticInformation

Public Properties:
pFeature : FEATURE = +context

HasA Constituents:
aContextView : ViewLayout

IndividualValue

*An individual value is either a single value or a set of timed values.*

Derived from StaticInformation

Public Properties:
pFeature : FEATURE = +value

HasA Constituents:
aLabel : CategoryLabel

ValueOverTime

*A ValueOverTime is a set of values for a single parameter that happen over time; a set of time-value pairs.*

Derived from IndividualValue

Public Properties:
pFeature : FEATURE = -single

HasA Constituents:
nDataPoint : DataPoint

SingleValue

*A single value is a single value in time.*

Derived from IndividualValue

Public Properties:
pFeature : FEATURE = +single

HasA Constituents:
aValueLabel : ValueLabel
aCategoryLabel : CategoryLabel
aInfoLabel : InfoLabel

LOGICAL VIEW REPORT

UIPrimitives

*The UIPrimitives category holds the specialization hierarchy for the terminal elements in a UI: a pushbutton at the next higher (UIComponent) level is two primitives: the hotspot and the label.*

LocatorButton

*A locator button is activated through a relative position change, or a click-hold-drag gesture. The input of a locator button is a relative change in either 1, 2, or 3 dimensions.*

Derived from DirectionSelector

Public Properties:
pFeature : FEATURE = -specific

SelectorButton

*A selector button is a user-selectable UI object that displays momentary (rather than persistent) action. Commonly used for commands ("Print", either as a pushbutton or a menu item), menu access buttons, representation of process objects, and as the number portion of a numbered verbal menu.*

Derived from IndicationSelector

Public Properties:
pFeature : FEATURE = -changestate

SpinnerButton

*A spinner button is a direction selector which is activated differentially depending on the amount of time between the activation and the de-activation (commonly a click-hold-release operation in a direct manipulation interface). Spinner buttons are usually used in conjunction with an editbox to "spin" through a set of contiguous values (weekdays, numbers, etc.).*

Derived from DirectionSelector

Public Properties:
pFeature : FEATURE = +specific
vDirection : DIR = Up
    If the vName of me contains the name of a specialization of the DIR
    datatype, set the value of vDirection to the name of that DIR
    specialization class.

Private Methods:
SetDirection () :
    If the vName of me contains a defined DIR class, then set the vDirection of me to the
    name of that class.

OnOffButton

*An on-off button is an indication selector that displays persistent (rather than momentary) selection action. Used for states that change when the on-off button is selected, most commonly for visually presented check buttons and radio buttons. In an auditory interface, would be represented by Yes-No or True/False questions.*

LOGICAL VIEW REPORT

Derived from IndicationSelector

Public Properties:

vState : BOOL = 0 pFeature : FEATURE = +changestate

Private Methods:

SetState () :
    vState = True if my vUIName = vValue of my vReferent.

TextEnter

A string-editable UI object. The Text Enter usually has a related primitive Labeller, which displays the value of the Text Enter string. The text enter can be masked; when masked, only mask-allowed entries can be made. Changes to the text enter are reflected by the associated Labeller value.

Derived from Enterer

Public Properties:

vMaskValue : STRING = ""
    The value of the mask string for this text box.

pFeature : FEATIRE = +freetext

Private Methods:

SetMaskValue () :
    vMaskValue = vMask of my vReferent.

Separator

A separator is usually a line object that separates two groups of UI objects; most commonly the line between related sets of menu items in a menu list.

Derived from Relator

Public Properties:

vSeparatedItems : PAIR(UIOBJ) = ""

pFeature : FEATURE = -continuity

Private Methods:

SetSeparatedItems () :
    Undefined.

Grouper

A grouper visually or temporally contains a number of other UI objects to separate them from other UI objects. Groupers include presentation of one menu node during a voice menu interaction, or a box around a set of mutually exclusive radio buttons.

Derived from Relator

Public Properties:

vGroupedItems : LIST(UIOBJ) = ""

pFeature : FEATURE = +union

Private Methods:

SetGroupedItems () :
    vGroupedItems = all of the vOwns of the vOwner of me, except me.

HotSpot

A hotspot is a marker for something selectable (versus something "typable" or something that can only express information, not collect it as input). A hotspot can resolve to a menu item that can be voice selected, a pushbutton on a VDU, a cursor in a three dimensional space.

LOGICAL VIEW REPORT

Derived from UIPrimitive

Public Properties:
pFeature : FEATURE = +action

Informer
*An informer is a category of UI primitive that presents information, but does not allow selection of or modification of the information.*

Derived from UIPrimitive

Public Properties:
pFeature : FEATURE = +information

Enterer
*An enterer is a basic UI primitive that collects string information, as opposed to the other two classes off basic primitive that accept selection input or accept no input at all.*

Derived from HotSpot

Public Properties:
vEditable : BOOL = 1
vOptional : BOOL = 1
pFeature : FEATURE = +keyboardcharacters

Private Methods:
SetEditable () :
    vEditable = vEditable of my vReferent.
SetOptional () :
    vOptional = opposite(pRequired) of my vRreferent.

DirectionSelector
*A direction selection allows a direction to be indicated, either through a drag or through a spin most commonly, but could be through a joystick, a head pointer, or a wink and a nod, for example.*

Derived from PushButton

Public Properties:
vIncrement : INTEGER = 1
pFeature : FEATURE = +amount

Private Methods:
SetIncrement () :
    vIncrement = the vIncrement of my vReferent.

IndicationSelector
*An indication selection accepts momentary selection input.*

Derived from PushButton

Public Properties:
pFeature : FEATURE = +choice

Axis
*An axis presents a series of contiguous values arranged as a bounded line.*

LOGICAL VIEW REPORT

Derived from Relator

Public Properties:
vOrientation : AXIS = Horizontal
pFeature : FEATURE = +continuity

Private Methods:
SetOrientation () :
   If the vUIName of me doesn't contain "Time", then set the vOrientation of me to Vertical.

Labeller

*A labeller is non-selectable text that either presents static information or presents the name, type, or value of an associated dynamic UI object (e.g., the label on a button).*

Derived from ValueInformer

Public Properties:
vLabelData : STRING
   The actual content of the label.

vAssociate : UIOBJ
   The associate is the UIPrimitive that is "associated" with this label; the hotspot button that is labelled "Print", for example.

pFeature : FEATURE = +identity

Private Methods:
SetLabelData () :
   The vLabeldata is the vValue of the vReferent.

SetAssociate () :
   The vAssociate = vUIName of the hotspot that this labeller provides the label for. For a value label of a radio button, the associate is the button's vUIName; for the category label of the radio button group, it is the vUIName of the parent (the vOwns of the labeller).

DataPoint

*A data point is a point drawn to show a value at a time. Serves as the points on a data graph that is bound by two axes.*

Derived from ValueInformer

Public Properties:
vDataValue : REAL
vDataStatus : STATUS = Good
vTimeValue : TIME
pFeature : FEATURE = +number

Private Methods:
SetDataValue () :
   The vDataValue represents the value half of a time-value pair.

SetDataStatus () :
   The vDataStatus is calculated by comparing to the vAlarm and vWarning values of the referent for current values; for time-value pairs, the goodness is either an attribute of the time-value pair or calculated from other stored attributes.

SetTimeValue () :
   The timevalue is the time portion of a time-value pair.

ViewLayout

*A viewlayout is a description of a visual presentation, usually a pointer to a file containing pointers to objects and a two or three dimensional representation of their physical relationships; may be a schematic drawing, a tagged Visio file, or some other representation.*

LOGICAL VIEW REPORT

Derived from Informer

Public Properties:

vFileName : FILENAME = ""

filename of the drawing of the contents of the display for this process group. drawing contains references to children of this process group, as objectnames and locations pFeature : FEATURE = +context

Private Methods:

SetFileName () :

The vFilename of the view layout is the Context Representation associated with the vReferent.

Relator

Derived from Informer

Public Properties:

pFeature : FEATURE = +relationship

ValueInformer

Derived from Informer

Public Properties:

pFeature : FEATURE = +value

PushButton

Derived from HotSpot

Public Properties:

pFeature : FEATURE = +pick

ValueLabel

*Value labels present a value for an object; the text in an edit box, the speed of a fan, etc.*

Derived from Labeller

Public Properties:

vDataStatus : STATUS = Good
pFeature : FEATURE = +status

Private Methods:

SetDataStatus () :

The data status is calculated as a function of whether the vValue of the vReferent is greater than the pWarnHi of the referent (STATUS = Warn) or greater than the pAlarmHi of the referent (STATUS = Alarm) or lower than the corresponding Lo warning and alarm values.

CategoryLabel

*Category labels label the category of an object; the "Color:" label for a setting choice, for example*

Derived from Labeller

Public Properties:

pFeature : FEATURE = +category

LOGICAL VIEW REPORT

InfoLabel
*Type labels present the type of an object; the shape of a fan icon, for example.*
Derived from Labeller
Public Properties:
pFeature : FEATURE = +info

UIPrimitive
Derived from UIOBJ
Public Properties:
pFeature : FEATURE = +primitive
Public Methods:
SetIndividual () :
> The public operation that includes the private operations of the individual UIPrimitive.

DOMAINCLASSES

APPOBJ
*An appobject is an object that InFac can treat as if it is a real-world object in the domain of interest.*
Public Properties:
vName : STRING
> The name of an appobject is a unique identifier for that object.

vLabel : STRING
> The label for an appobject is a user-understandable tag for the real-world appobject.

vParent : APPOBJ
> The parent of an appobject is its container; a field on a SARIR has the set as its parent; the set has the SARIR. A vFeatures : LIST(FEATURE)
> The features of an appobject are generated when InFac places it in it's domain model, or interacts with an object in another domain model. These features are used to select DIG objects to represent the appobject to a human.

Public Methods:
SetFeatures (argname : argtype = default) : return
> When an appobject is created for use by InFac, it sets its vFeatures attribute to a list of all the features that match the object's information properties. Currently defined as a walk through each branch of the features tree; for each category or feature class, the name of the feature is added to the list of vFeatures if the appobject's associated field (as defined for each feature) matches the feature's parameters.

SetOtherVars (argname : argtype = default) : return
HasA Constituents:
aContextRepresentation : ContextRepresentation
aGraphicRepresentation : GraphicRepresentation

LOGICAL VIEW REPORT

DomainComponent
*A domain component is an object in the domain which is make up of other components or domain primitives.*

Derived from APPOBJ

HasA Constituents:
nContainedObjects : APPOBJ

DomainPrimitive
*A domain primitive cannot contain other appobjects; A ship is a domain component which has at least one domain primitive, shipcolor. ShipColor is also contained by SEAINCDT, a set in a SARIR. Other examples are Person'sName, BusinessAddress, NumberOfFans. Domain components at any level can have domain primitives; domain primitives cannot be further decomposed.*

Derived from APPOBJ

Public Properties:
vValue : STRING
> The value of a domain primitive is the actual value of the realworld appobject. The pValue of the domain primitive shipcolor = red; of the domain primitive fan speed = 100%.

vRequired : BOOL
> Whether or not the domain primitive is required to have a value.

vSecrecy : INTEGER
> Level of secrecy of the value of the domain primitive.

vSource : STRING
> Source of the value of the domain primitive.

vEditable : BOOL
> Whether or not the value of the domain primitive is editable (regardless of secrecy level).

HasA Constituents:
aSchedule : Schedule
aValueHistory : ValueHistory

ContinuousDataItem
*A data item whose value is a point on a continuous scale. These are traditional setpoints and sensor values. Specialized as Duration, Speed, Temperature, Quantitiy.*

Derived from ValueDataItem

Public Properties:
vMinimum : REAL
> The logial minimum for the data item.

vMaximum : REAL
> The logical maximum for the data item.

vAlarmHi : REAL
> The high alarm value; the value of the data item at which a high alarm value is generated.

LOGICAL VIEW REPORT vAlarmLo : REAL
 The lower bound value of the data item at which an alarm is generated.

vWarnHi : REAL
 The high bound value of a data item at which a warning is generated.

vWarnLo : REAL
 The low bound value of a data item at which a warning is generated.

vValue : REAL
 The current value of the data item.

vUnits : MEASURE = NULL
 The units, if any, in which the value of the data item are expressed.

vRequested : REAL
 The requested (as opposed to the actual) value of the data item; e.g., the room temperature setting or the requested speed.

vIncrement : INTEGER
 The logical increment for increasing or decreasing the requested or actual value of a dataitem.

vSpecificity : BOOL = 1
 Whether or not the dataitem is specific (1=true) or relative (0=false); captures distinction requiring an additional slider and axis if not specific.

DiscreteDataItem

*A discrete data item is a dataitem that contains a value that is one of a set of allowable values. The specializations of discrete data item are entity, state, property, action, cause.*

Derived from ConstrainedDataItem
Public Properties:
vExtendable : BOOL
 Whether or not the set of Choices for the data item can be extended.

vOrdered : BOOL
 The number of values a data item can take; usually = 1 (exclusive item from a set), but may be greater than 1 for non-exclusive choices (members of a team, choices from a three column choice).

vNumChoices : INTEGER

UniqueDataItem

*A unique data item is one whose value is not a numeric value and not a member of a set. It has the specializations of Unique Name, Unique Number, GeneralID and Descriptive Prose.*

Derived from DomainPrimitive

ValueHistory

*The value history is a history of the values of the appobject.*

Derived from DATAVIEW
Public Properties:
pTimeSpan : TIMESPAN = Past

LOGICAL VIEW REPORT

Schedule
*The schedule provides the time-value or event-value pairs that make up the predicted and/or set values for the future behavior of the appobject.*
Derived from DATAVIEW
Public Properties:
pTimeSpan : TIMESPAN = Future

GraphicRepresentation
*A graphic representation provides the graphic for the object, often an icon.*
Derived from DATAVIEW
Public Properties:
pTimeSpan : TIMESPAN = Current

DATAVIEW
*A data view is a file associated with an appobject that contains some aspect of its data.*
Public Properties:
pFilename : FILENAME
   The filename assoicated with dataview is the name of the file that contains the appobject's data.

Action
*The data item's value represents an action: View Trend, Acknowledge*
Derived from DiscreteDataItem

State
*The dataitem's value represents an object state, like on or sleeping.*
Derived from DiscreteDataItem

UniqueNumber
*A choice that represents a unique identifier, like a social security number, a call sign, a serial number, a filename.*
Derived from UniqueDataItem
Public Properties:
vMask : MASK

Temperature
*A temperature data item has a value that represents the temperature of something.*
Derived from ContinuousDataItem
Public Properties:
vUnits : MEASURE = degF
   The default measure for temperature is degF (degrees fahrenheit).

Property
*The dataitem's value represents a property, like color.*
Derived from DiscreteDataItem

LOGICAL VIEW REPORT

Speed
*Speed is a data item representing a distance over time value (mph, rpm).*
Derived from ContinuousDataItem
Public Properties:
vUnits : MEASURE = rpm
    The default measure for speed is rpm (revolutions per minute).

DescProse
*A data item whose value is prose, generally a freetext description of something.*
Derived from UniqueDataItem

GeneralID
Derived from UniqueDataItem

UniqueName
*A unique name is a type of data item whose value represents a name of an entity, like "Sam Jones" or Houston.*
Derived from UniqueDataItem

DateTimeGroup
*A data item whose value represents a date and time, with year, month, day, hour, minute, second, msec.*
Derived from TimeDataItem
Public Properties:
vValue : DATETIME

DateValue
*A data item whose value represents a date, including day, month, and year.*
Derived from TimeDataItem
Public Properties:
vValue : DATE

MonthValue
*A data item whose value is the name of a month.*
Derived from TimeSet
Public Properties:
vValue : MONTH

Cause
*The data item's value represents a cause, like fire.*
Derived from DiscreteDataItem

Entity
*A discrete data item whose value represents an entity or object; a motor may have one of three distinct flanges.*

LOGICAL VIEW REPORT

Derived from DiscreteDataItem

TimeDataItem
A timeitem data item is a data item whose value represents a time.
Derived from ConstrainedDataItem

Duration
Duration is a data item that represents a span of time (2 hr, 3 yr 12 mos)
Derived from ContinuousDataItem
Public Properties:
vUnits : MEASURE = min
    The default units for duration is minutes.

ContextRepresentation
A context representation is a file that provides the context for an appobject.
Derived from DATAVIEW
Public Properties:
pTimeSpan : TIMESPAN = Current

TimeValue
A data item whose value is a time value, with hours (of 24), minutes, seconds, and possibly msec.
Derived from TimeDataItem
Public Properties:
vValue : TIME

ValueDataItem
A value data item is a dataitem whose value is a numeric value, either a timeitem, a location, or a continuous data value.
Derived from ConstrainedDataItem

Location
A data item whose value represents a location.
Derived from ValueDataItem
Public Properties:
vValue : LOC

Quantity
A quantity data item has a value representing a quantity of something, usually with no units.
Derived from ContinuousDataItem

Quality
Derived from DiscreteDataItem

LOGICAL VIEW REPORT

SingleAction
Derived from UniqueDataItem

SingleEntity
Derived from UniqueDataItem

TimeSet
Derived from DiscreteDataItem

ConstrainedDataItem
Derived from DomainPrimitive
Public Properties:
vChoices : LIST

VARTYPES

VariableType
*The root node for variable types for DIG and for the Domain*

CommonVariableTypes
*Variable types that are common to all objects.*
Derived from VariableType

BOOL
*Boolean: 0=False, 1=True*
Derived from CommonVariableTypes

STRING
*A character string.*
Derived from CommonVariableTypes

CONTEXT
*A context is the scope of reference of an object; an object applies, for example, to an application, or an object within an application, or a value of a property of an object in an application, etc.*
Derived from DIGVariableType

FORMAT
*The prototypical format for a task or interaction.*
Derived from DIGVariableType

FILENAME
*Pointer or reference to a file location.*

LOGICAL VIEW REPORT

Derived from CommonVariableTypes

INTEGER
*A whole number; may be negative.*
Derived from CommonVariableTypes

REAL
*A regular old number with a decimal and/or a negative sign.*
Derived from CommonVariableTypes

TIMESPAN
*A timespan reflects that origin of information or the location in time of an action: current information, past information, future (planned or projected) information.*
Derived from CommonVariableTypes

Past
*Timespan that has occured.*
Derived from TIMESPAN

Current
*Ongoing timespan.*
Derived from TIMESPAN

Future
*Timespan that has not occured.*
Derived from TIMESPAN

DIGVariableType
*The root variable type. Variable types are used to type the attributes of objects in the DIG model.*
Derived from VariableType

APP
*The context of an application.*
Derived from CONTEXT

OBJ
*The context of an object within an application.*
Derived from CONTEXT

Choices
*A set of choices.*
Derived from FORMAT

LOGICAL VIEW REPORT

Form
   *A form format, where an object is the subject of the form, and the various relevant properties or attributes of the object are presented as labelled fields containing the value of the labelled property.*
   Derived from FORMAT

Trend
   *A value over time graph.*
   Derived from FORMAT

Map
   *A map or schematic format, where the object is represented by the (2D) map and the sub-objects are shown in physical relationship to each other.*
   Derived from FORMAT

RESULT
   *A result marks the message sent back from a dynamic component.*
   Derived from DIGVariableType

ChangeValue
   *The result of invoking an object is to change the value of that object.*
   Derived from RESULT

InvokeAction
   *The result of invoking an object is to invoke the action it represents.*
   Derived from RESULT

SelectObject
   *The result of invoking an object is to select the object it represents.*
   Derived from RESULT

SelectItem
   *The result of invoking a dynamic object is to select that object.*
   Derived from RESULT

ExclusiveSelectItem
   *The result of invoking an object is to select that object and de-select all other objects in its group.*
   Derived from RESULT

ChangeState
   *Changes the state of the object.*

LOGICAL VIEW REPORT

Derived from RESULT

DIR
*Dir is a direction: up, down, right, left; in relation to the viewer.*
Derived from DIGVariableType

Up
*Up against gravity.*
Derived from DIR

Down
*Down towards gravity.*
Derived from DIR

Right
*Right in relation to the viewer.*
Derived from DIR

Left
*Left in relation to the viewer.*
Derived from DIR

DomainVariableTypes
*The root node for the domain-specific variables; these variables and datatypes are used by the appobjects and not the uiobjects.*
Derived from VariableType

LOC
*This is an abstract data type that represents a location.*
Derived from DomainVariableTypes

TIME
*An abstract data type that represents a time value. Includes hour (24), min, sec, msec.*
Derived from DomainVariableTypes

DATETIME
*A date time value, with year, month, day, hour (24), minute, sec, msec.*
Derived from DomainVariableTypes

DATE
*A date value: year, month, day*
Derived from DomainVariableTypes

MONTH
*A month value.*

LOGICAL VIEW REPORT

Derived from DomainVariableTypes

MASK
*A mask template, like nnn-nn-nnnn for social security number.*
Derived from DomainVariableTypes

STATUS
*The status is a valuation of the goodness of a piece of data; within or without the alarm or tolerance boundaries.*
Derived from DIGVariableType

Good
Derived from STATUS

Warn
Derived from STATUS

Alarm
Derived from STATUS

AXIS
*The two-dimensional axis.*
Derived from DIGVariableType

Horizontal
*Horizontal (left-right) axis.*
Derived from AXIS

Vertical
*Vertical (up-down) axis.*
Derived from AXIS

MEASURE
*A measure data type represents the various types of units which express a value.*
Derived from DomainVariableTypes

SpeedMeasure
*Speed measures are units in which speed may be expressed.*
Derived from MEASURE rpm
*revolutions per minute is the default speed unit of measure.*
Derived from SpeedMeasure

LOGICAL VIEW REPORT mph
*miles per hour is a unit of speed measurement.*
Derived from SpeedMeasure

TemperatureMeasure
*Temperature measures are units in which temperature may be expressed.*
Derived from MEASURE degF
*degrees Fahrenheit is the default temperature measure.*
Derived from TemperatureMeasure degC
*degrees Centigrade is a common temperature measure.*
Derived from TemperatureMeasure

DistanceMeasure
*Distance measures are units in which distances or lengths may be expressed.*
Derived from MEASURE mile
*mile is the default distance measure.*
Derived from DistanceMeasure

TimeMeasure
*Time measures are units in whih time may be expressed.*
Derived from MEASURE min
*min is the default time measure*
Derived from TimeMeasure

FEATURE
*A feature distinguishes an object from the other objects at it's level of detail.*
Derived from DIGVariableType

+action
*The object represents/doesn't represent an action.*
Derived from FEATURE

+amount
*Data reflects an amount.*
Derived from FEATURE

LOGICAL VIEW REPORT

+application
*The object is an application.*
Derived from FEATURE

+category
*Category of an object.*
Derived from FEATURE

+changestate
*Object changes a state.*
Derived from FEATURE

+choice
*Action is choice.*
Derived from FEATURE

+communication
Derived from FEATURE

+component
*A feature marking a component in the Interaction-Space.*
Derived from FEATURE

+context
Derived from FEATURE

+continuity
*Data does or does not reflect a continuity.*
Derived from FEATURE

+definition
*Provides definition information.*
Derived from FEATURE

+discourse
*This feature discriminates between discourse and non-discourse elements.*
Derived from FEATURE

+discrete
*Data is discrete.*
Derived from FEATURE

+dismiss
*Dismisses another object.*

LOGICAL VIEW REPORT

Derived from FEATURE

+dynamic
Derived from FEATURE

+equivalence
*Equivalence data*
Derived from FEATURE

+exclusive
*An exclusive choice from a set.*
Derived from FEATURE

+fixed
*Data set is fixed.*
Derived from FEATURE

+hierarchical
*Data is organized hierarchically rahter than in in a single list.*
Derived from FEATURE

+identity
*Data provides identity information.*
Derived from FEATURE

+info
*Information about an object.*
Derived from FEATURE

+information
*Data that provides information.*
Derived from FEATURE

+invoke
*The object invokes/ another object.*
Derived from FEATURE

+item
*The object is/ is not a sub-item (property) of another object. The color of an object is +item, the various parts of an object are +subobject.*
Derived from FEATURE

+keyboardcharacters
*Data is composed of keyboard characters.*

LOGICAL VIEW REPORT

Derived from FEATURE

+meta
*The object is/is not a meta object.*
Derived from FEATURE

+number
Derived from FEATURE

+object
*This feature denotes an object.*
Derived from FEATURE

+objects
Derived from FEATURE

+overtime
*No state change*
Derived from FEATURE

+pick
*Action is pick.*
Derived from FEATURE

+plan
*Provides plan information.*
Derived from FEATURE

+primitive
Derived from FEATURE

+relationship
*Data reflects a relationship.*
Derived from FEATURE

+review
*A review feature indicates whether the information is a summary/review or detail.*
Derived from FEATURE

+set
*An item of a sett.*
Derived from FEATURE

LOGICAL VIEW REPORT

+single
Whether or not an element is a single element or a group.
Derived from FEATURE

+specific
A specific, rather than a continuous, value.
Derived from FEATURE

+state
A state component.
Derived from FEATURE

+status
This feature denotes a status object.
Derived from FEATURE

+subobject
The object does not represent a value.
Derived from FEATURE

+subtask
The object is/is not a subobject (part) of it's parent object.
A steering wheel is a +subobject of a car; a passenger is -subobject. The color of the car is +item.
Derived from FEATURE

+systemtouser
The element involves information transferred from a system to a user.
Derived from FEATURE

+task
The object is a task.
Derived from FEATURE

+time
The object represents/doesn't represent a time value.
Derived from FEATURE

+topic
The object is/is not a topic of a higher level object.
Derived from FEATURE

+union
Relationship is one of union.

LOGICAL VIEW REPORT

Derived from FEATURE

+usertosystem
*The element involves information transfer from a user to a system.*
Derived from FEATURE

+value
*The object represents a value.*
Derived from FEATURE

+view
Derived from FEATURE

+views
*The object is/ is not a view of another object.*
Derived from FEATURE

-continuity
Derived from FEATURE

-discrete
*Data is continuous.*
Derived from FEATURE

-dynamic
Derived from FEATURE

-exclusive
*A non-exclusive choice.*
Derived from FEATURE

-fixed
*Data set is extendable.*
Derived from FEATURE

-hierarchical
*A single rather than hierarchical list.*
Derived from FEATURE

-set
Derived from FEATURE

-single
*Not a single element, but a group.*

LOGICAL VIEW REPORT

Derived from FEATURE

-specific
Not a specific, but a continuous, value.
Derived from FEATURE

INTERACTIONMANAGEMENT

The InteractionManagement category is outside of DIG. It is the category that holds the agents and techs and any other information, models, or heuristics required to perform Dynamic Interaction Generation.

IntelligentEntitites

SocietyAgent
Derived from IntelligentEntitites

InteractionFacilitator
The Interaction Facilitator (InFac) tells a class in the User Interface Model to create itself as a named e
Derived from SocietyAgent

Technician
Derived from IntelligentEntitites

JavaTech
The JavaTech is the technician who knows how to translate the objects in the Interaction-Space into Java.awt objects and present them on the screen.
Derived from Technician

What is claimed is:

1. An interaction synthesizing system for a computer running an application program formed of multiple objects, the system comprising:
   an interaction space including:
      a top level user interface object;
      an intermediate level abstract object representing an abstract user interaction type selected from the group consisting of tasks, subtasks, components, and primitives, wherein the intermediate level abstract object inherits capabilities from the to level user interface object; and
      an instantiable object representative of a user interface element, wherein the instantiable object inherits capabilities from the to level user interface object or from the intermediate level abstract object; and
   an interface synthesizer which generates the user interaction representations for a current state of an application and modifies the interaction space dynamically in response to changes in the application objects.

2. The system of claim 1 wherein the user interaction representations are representative of sensed parameters.

3. A method of creating a user interface for an application program running on a computer system having devices available for communicating with a user, comprising the computer-executed steps of:
   retrieving an interaction model of interaction requirements for general situational components of the application program, the interaction model including:
      a top level user interface object;
      an intermediate level abstract object representing an abstract user interaction type selected from the group consisting of tasks, subtasks, components, and primitives, wherein the intermediate level abstract object inherits capabilities from the to level user interface object; and
      an instantiable object representative of a user interface element, wherein the instantiable object inherits capabilities from the to level user interface object or from the intermediate level abstract object;
   creating an interaction space representative of current interaction requirements of the application program using the interaction model;
   dynamically creating a user interface for the application program based on the interaction space and available user interaction devices; and
   modifying the interaction space in response to changes in the application program.

4. The method of claim 3 wherein the available interaction devices have different capabilities for interacting with a user, and wherein the user interface is dynamically created responsive to those different capabilities.

5. The method of claim 4 wherein one of the devices comprises a telephone, and the other device comprises a computer, and wherein the interface created for the telephone provides information to the user in the form of voice, and wherein the interface created for the computer comprises a visual representation of the interaction space.

6. A method of creating an interaction space having components representative of user interaction needs with an application program, comprising the computerized steps of:
   perceiving an interaction need;
   entering an interaction class model at a point dependent on the perceived interaction need, the interaction class model including:
      a top level user interface object;
      an intermediate level abstract object representing an abstract user interaction type selected from the group consisting of tasks, subtasks, components, and primitives, wherein the intermediate level abstract object inherits capabilities from the to level user interface object; and
      an instantiable node representative of user interface elements, wherein the instantiable node inherits capabilities from the to level user interface object or from the intermediate level abstract object;
   specializing the class model to arrive at the instantiable node in the interaction class model;
   adding the instantiable node to the interaction space; and
   modifying the interaction space dynamically in response to changes in the application program.

7. The method of claim 6 and further comprising the step of:
   converting the interaction space into a user interface.

8. The method of claim 7 wherein the conversion of the interaction space into a user interface step is performed as a function of capabilities of a user interaction device.

9. A non-transitory machine readable medium comprising instructions that when executed by a processor execute a process comprising:
   inheriting capabilities from a top level user interface object to an intermediate level abstract object representing an abstract user interaction type, wherein the top level abstract user interface object has a create operation, and wherein the intermediate level abstract object comprises an object selected from the group consisting of tasks, subtasks, components, and primitives;
   inheriting capabilities from the top level object or intermediate level object to an instantiable object representative of a user interface element;
   automatically dynamically generating the user interaction representation for a current state of an application; and
   modifying the user interaction representation in response to changes in the application.

10. A machine readable medium having instructions stored thereon for causing a suitably programmed computer to perform the computerized steps comprising:
   retrieving an interaction model of interaction requirements for general situational components of the application program, the interaction model including:
      a top level user interface object;
      an intermediate level abstract object representing an abstract user interaction type selected from the group consisting of tasks, subtasks, components, and primitives, wherein the intermediate level abstract object inherits capabilities from the to level user interface object; and
      an instantiable object representative of a user interface element, wherein the instantiable object inherits capabilities from the to level user interface object or from the intermediate level abstract object;
   constructing a representation of current interaction requirements of the application program using the interaction model;
   creating an interaction space from the representation, from one or more abstract compositional constraints, and from one or more selected properties of the application program;
   dynamically creating a user interface for the application program based on the interaction space and available devices; and
   modifying the interaction space in response to changes in the application program.

11. A machine readable medium having instructions stored thereon for causing a suitably programmed computer to perform the steps comprising:
- perceiving a change in an object in an application having an interaction need;
- entering an interaction class model at a point dependent on the perceived interaction need, the interaction class model including:
  - a top level user interface object;
  - an intermediate level abstract object representing an abstract user interaction type selected from the group consisting of tasks, subtasks, components, and primitives, wherein the intermediate level abstract object inherits capabilities from the to level user interface object; and
  - an instantiable object representative of user interface elements, wherein the instantiable object inherits capabilities from the to level user interface object or from the intermediate level abstract object;
- specializing the class model to arrive at the instantiable object in the interaction class model; and
- adding the instantiable object to the interaction space.

12. A computer system comprising:
- an application comprised of multiple objects, including to level objects for interacting with users;
- an interaction class model including:
  - an intermediate level abstract object representing an abstract user interaction type selected from the group consisting of tasks, subtasks, components, and primitives, wherein the intermediate level abstract object inherits capabilities from the to level user interface object; and
  - an instantiable class model object representative of a user interface element, wherein the instantiable object inherits capabilities from the to level user interface object or from the intermediate level abstract object; and
- an interaction facilitator coupled to the application and to the interaction class model for creating an interaction space comprised of the instantiated class model objects responsive to currently active application objects and for modifying the interaction space dynamically in response to changes in the application objects.

13. The system of claim 12 wherein the application comprises multiple dynamically varying networked objects.

14. The system of claim 12 wherein the application is selected from the group consisting of search and rescue applications, building management applications, and process control applications.

15. The system of claim 12 and further comprising a module coupled to the interaction space for converting interaction elements to a user interface on a selected device based on the capabilities of the selected device.

16. The system of claim 15 wherein the module is selected from the group consisting of a JavaTech, and a SpeechTech.

* * * * *